(12) United States Patent
Ichikawa et al.

(10) Patent No.: US 8,238,013 B2
(45) Date of Patent: Aug. 7, 2012

(54) PROJECTION APPARATUS USING MICROMIRROR DEVICE

(75) Inventors: Hirotoshi Ichikawa, Tokyo (JP); Fusao Ishii, Menlo Park, CA (US)

(73) Assignees: Silicon Quest Kabushiki-Kaisha (JP); Olympus Corporation (JP)

(*) Notice: Subject to any disclaimer, the term of this patent is extended or adjusted under 35 U.S.C. 154(b) by 307 days.

(21) Appl. No.: 12/381,586

(22) Filed: Mar. 12, 2009

(65) Prior Publication Data
US 2009/0180171 A1 Jul. 16, 2009

Related U.S. Application Data

(63) Continuation-in-part of application No. 11/728,553, filed on Mar. 18, 2007, now Pat. No. 7,646,527, which is a continuation-in-part of application No. 11/121,543, filed on May 4, 2005, now Pat. No. 7,268,932, and a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/069,228, filed on Mar. 13, 2008, provisional application No. 60/786,256, filed on Mar. 26, 2006.

(51) Int. Cl.
*G02B 26/00* (2006.01)
(52) U.S. Cl. ........................ 359/237; 359/290
(58) Field of Classification Search ............... 359/237
See application file for complete search history.

(56) References Cited

U.S. PATENT DOCUMENTS

| | | | |
|---|---|---|---|
| 6,220,730 B1 | 4/2001 | Hewlett et al. | |
| 6,592,227 B2 | 7/2003 | Ouchi et al. | |
| 6,648,476 B2 | 11/2003 | Watanabe | |
| 2004/0119950 A1* | 6/2004 | Penn et al. | 353/97 |

* cited by examiner

*Primary Examiner* — James Jones
(74) *Attorney, Agent, or Firm* — Bo-In Lin

(57) ABSTRACT

A projection apparatus comprising a micromirror device for reflecting and modulating a light emitted from a light source to project a display an image on a display screen. The projection apparatus further includes a projection optical system comprises an adjustable aperture for adjusting an aperture ratio to control an amount of output light reflected from the micromirror device to the image display screen.

11 Claims, 19 Drawing Sheets

PROJECTION APPARATUS USING MICROMIRROR DEVICE

CROSS REFERENCE OF RELATED APPLICATIONS

This application is a Non-provisional Application of a Provisional Application 61/069,228 filed on Mar. 13, 2008 and a Continuation in Part application of another patent application Ser. No. 11/728,553 filed on Mar. 18, 2007 now U.S. Pat. No. 7,646,527. The application Ser. No. 11/728,553 is a Non-provisional Application of a Provisional Application of 60/786,256 filed on Mar. 26, 2006. The application Ser. No. 11/728,553 is further a Continuation in Part (CIP) application of a Non-provisional patent application Ser. No. 11/121,543 filed on May 4, 2005 issued into U.S. Pat. No. 7,268,932 and another Non-provisional application Ser. No. 10/698,620 filed on Nov. 1, 2003 now abandoned. The application Ser. No. 11/121,543 is a Continuation In Part (CIP) application of three previously filed applications. These three Applications are Ser. No. 10/698,620 filed on Nov. 1, 2003; Ser. No. 10/699,140 filed on Nov. 1, 2003 now issued into U.S. Pat. No. 6,862,127; and Ser. No. 10/699,143 filed on Nov. 1, 2003 now issued into U.S. Pat. No. 6,903,860 by the Applicant of this patent applications. The disclosures made in these patent applications are hereby incorporated by reference in this patent application.

BACKGROUND OF THE INVENTION

1. Field of the Invention

The present invention relates generally to a projection apparatus implemented with a micromirror device. More particularly, this invention relates to a projection apparatus implemented with a micromirror device combining with a control process for adjusting an aperture ratio of a projection optical system to further increase the gradations of gray scales for improving quality of the image display.

2. Description of the Related Art

Even though there have been significant advances made in recent years on the technologies of implementing electromechanical micromirror devices as spatial light modulator, there are still limitations and difficulties when employed to provide high quality images display. Specifically, when the display images are digitally controlled, the image qualities are adversely affected due to the fact that the image is not displayed with a sufficient number of gray scales.

Electromechanical micromirror devices have been drawing considerable interest because of their application as spatial light modulators (SLMs). A spatial light modulator requires an array of a relatively large number of micromirror devices. In general, the number of devices required ranges from 60,000 to several million for each SLM. Referring to FIG. 1A, a digital video system 1 including a display screen 2 as disclosed in a relevant U.S. Pat. No. 5,214,420. A light source 10 is used to generate light energy for ultimate illumination of display screen 2. Light 9 generated is further concentrated and directed toward lens 12 by mirror 11. Lens 12, 13 and 14 form a beam columnator to operative to columnate light 9 into a column of light 8. A spatial light modulator 15 is controlled by a computer 19 through data transmitted over data cable 18 to selectively redirect a portion of the light from path 7 toward lens 5 to display on screen 2. The SLM 15 has a surface 16 that includes an array of switchable reflective elements, e.g., micromirror devices 32, such as elements 17, 27, 37, and 47 as reflective elements attached to a hinge 30 that shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

The on-and-off states of micromirror control scheme as that implemented in the U.S. Pat. No. 5,214,420 and by most of the conventional display system imposes a limitation on the quality of the display. Specifically, when applying conventional configuration of control circuit has a limitation that the gray scale of conventional system (PWM between ON and OFF states) is limited by the LSB (least significant bit, or the least pulse width). Due to the On-Off states implemented in the conventional systems, there is no way to provide shorter pulse width than the LSB. The smallest brightness, which determines the gray scale, is the light reflected during the smallest pulse width. The limited gray scale leads to degradations of image display.

Specifically, in FIG. 1C an exemplary circuit diagram of a prior art control circuit for a micromirror according to U.S. Pat. No. 5,285,407. The control circuit includes memory cell 32. Various transistors are referred to as "M*", where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a wordline. Latch 32a is formed from two cross-coupled inverters, M5/M6 and M7/M8, which permit two stable states, that is, state 1 is Node A high and Node B low and state 2 is Node A low and Node B high.

The dual states switching as illustrated by the control circuit controls the micromirrors to position either at an ON or OFF angular orientation as that shown in FIG. 1A. The brightness, i.e., the gray scales of display for a digitally control image system, is determined by the length of time the micromirror stays at an ON position. The length of time a micromirror controlled at an ON position is in turn controlled by a multiple bit word. For simplicity of illustration, FIG. 1D shows the "binary time intervals" when control by a four-bit word. As that shown in FIG. 1D, the time durations have relative values of 1, 2, 4, 8 that in turn define the relative brightness for each of the four bits, where 1 is for the least significant bit and 8 is for the most significant bit. According to the shown control mechanism, the minimum controllable difference between gray scales for showing different brightness is brightness represented by a "least significant bit" that maintains the micromirror at an ON position.

When adjacent image pixels are shown with a great variance in gray scales due to the controllability of gray scales being very coarse, artifacts are shown between these adjacent image pixels. This leads to image degradations. The image degradations are especially pronounced in bright areas of display when there are "bigger gaps" of gray scales between adjacent image pixels. It was observed in an image of a female model that there were artifacts shown on the forehead, the sides of the nose and the upper arm. The artifacts are generated due to a technical limitation when the digitally controlled display does not provide sufficient gray scales. At the bright spots of display, e.g., the forehead, the sides of the nose and the upper arm, the adjacent pixels are displayed with visible gaps of light intensities.

As the micromirrors are controlled to have a fully on and fully off position, the light intensity is determined by the length of time the micromirror is at the fully on position. In order to increase the number of gray scales of display, the speed of the micromirror must be increased such that the digital control signals can be increased to a higher number of bits. However, when the speed of the micromirrors is increased, a strong hinge is necessary for the micromirror to sustain a required number of operational cycles for a designated lifetime of operation. In order to drive the micromirrors supported on a further strengthened hinge, a higher voltage is required. The higher voltage may exceed twenty volts and may even be as high as thirty volts. A micromirror manufacturing process applying the CMOS technologies probably produce micromirrors that would not be suitable for operation at such a higher range of voltages and therefore the DMOS micromirror devices could be required in this situation. In order to achieve a higher degree of gray scale control, a more complicated manufacturing process and larger device areas are necessary when a DMOS micromirror is implemented. Conventional modes of micromirror control are therefore facing a technical challenge due to the fact that the gray scale accuracy has to be sacrificed for the benefit of a smaller and more cost effective micromirror display due to the operational voltage limitations.

There are many patents related to light intensity control. These patents include U.S. Pat. Nos. 5,589,852, 6,232,963, 6,592,227, 6,648,476, and 6,819,064. There are further patents and patent applications related to different shapes of light sources. These patents include U.S. Pat. Nos. 5,442,414, 6,036,318 and Application 2003/0147052. U.S. Pat. No. 6,746,123 discloses special polarized light sources for preventing light loss. However, these patents and patent applications do not provide an effective solution to overcome the limitations caused by insufficient gray scales in the digitally controlled image display systems.

Furthermore, there are many patents related to spatial light modulation, including U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed and provided direct resolutions for a person of ordinary skill in the art to overcome the above-discussed limitations and difficulties.

Therefore, a need still exists in the art of image display systems applying digital control of a micromirror array as a spatial light modulator to provide new and improved systems such that the above-discussed difficulties can be resolved.

SUMMARY OF THE INVENTION

An aspect of the present invention is to provide a projection apparatus for improving the projected image with higher gray scales by controlling the operations of a number of deflection mirrors of a micromirror device in coordination with a control process for adjusting the aperture ratio of a projection optical system.

In order to achieve the above object, an exemplary embodiment of the present invention is a projection apparatus comprises a micromirror device for reflecting and modulating a light emitted from a light source to project an image on a display screen. The projection apparatus further includes a projection optical system comprises an adjustable aperture for adjusting an aperture ratio to control an amount of output light reflected from the micromirror device to the image display screen.

Another exemplary embodiment of the present invention is a projection apparatus comprises a micromirror device having a plurality of micromirrors for reflecting and modulating a light emitted from a light source to project an image on a display screen. The projection apparatus further comprising a controller for controlling each of the micromirrors to operate in a first state, a second state and a third state as an intermediate state with the micromirrors oscillating between the first and second states; the controller controls a light intensity distribution in an Numerical Aperture (NA) of an illumination optical system condensing and orienting light from the light source for minimizing a change in a ratio of an output light intensity in the third state caused by a change of an aperture ratio of a projection optical system disposed on a reflected light path in the first state of the deflection mirror.

BRIEF DESCRIPTION OF THE DRAWINGS

The present invention is described in detail below with reference to the following Figures.

DESCRIPTION OF THE PREFERRED EMBODIMENTS

Figure 2:
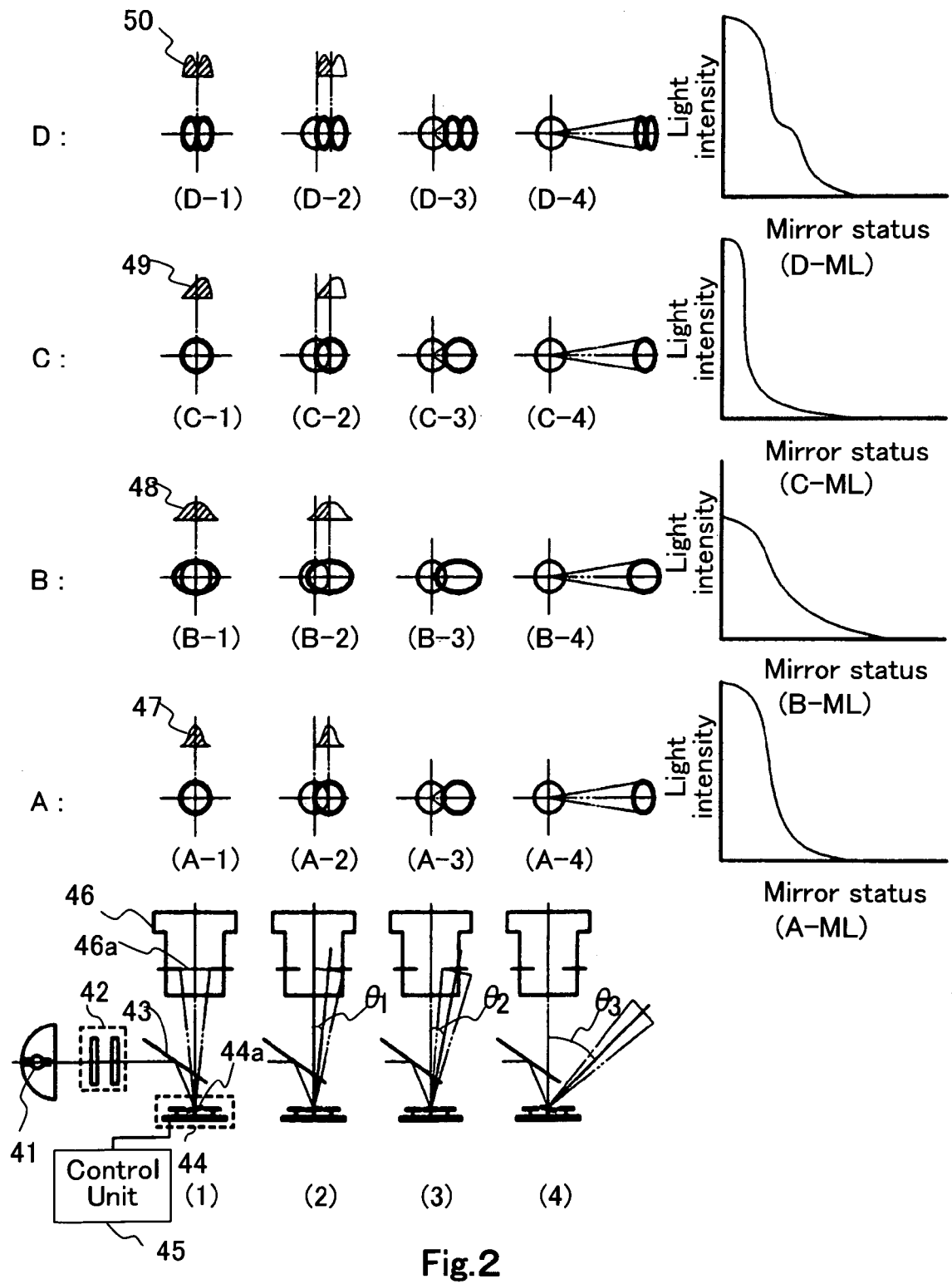
FIG. 2 are diagrams showing different shapes and intensity distributions of incident light that coordinate with the deflecting mirror of a SLM to generate image light intensity distributions when the deflecting mirror is moved to different angular positions.
Figure 3:
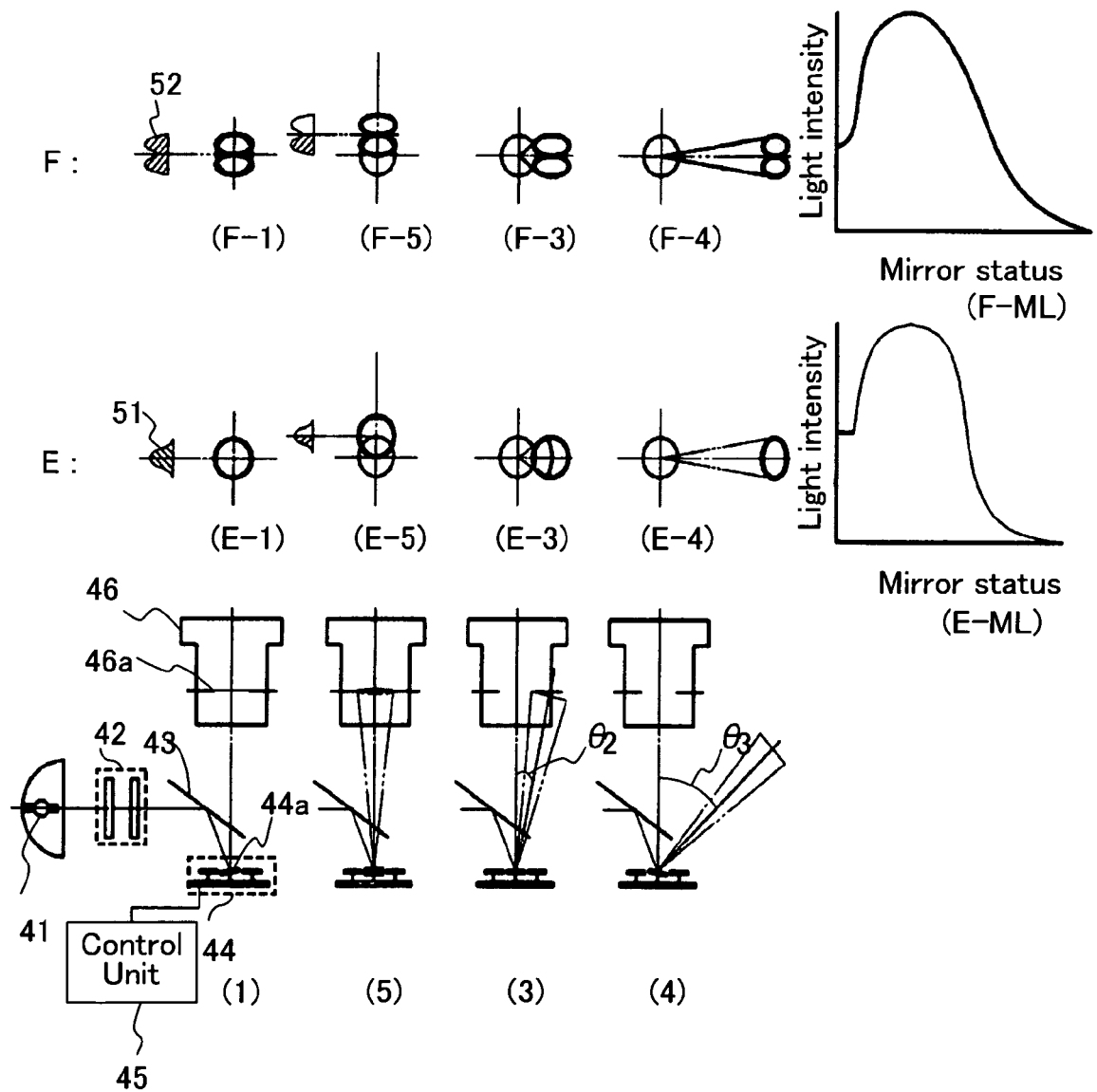
FIG. 3 are additional diagrams showing different shapes and intensity distributions of incident light that coordinate with the deflecting mirror of a SLM to generate image light intensity distributions when the deflecting mirror is moved to different angular positions.

Refer to FIGS. 2 and 3, which illustrate the operation principles according to a first embodiment of this invention. The first embodiment is a projection device using a deflecting type of spatial light modulator placed in the light path from an illumination. The light path has a non-uniform light distribution at the pupil, iris, or stop to increase the levels of the gray-scale. Improvements of gray scale levels are achieved by controlling the incident light.

FIGS. 2 and 3 show the configuration of a display system (1) according to this embodiment. The projection device comprises a light source 41, illumination optical functional assembly 42, such as a condenser lens, etc., for collecting and directing light from the light source 41, a mirror 43 for reflecting the light from the illumination optical functional assembly 42 to a deflecting type spatial light modulator (hereinafter referred to simply as "SLM"), a control unit 45 for controlling the deflection angle holding operation and the oscillation operation of each deflecting mirror (44a, etc.) of the SLM 44 based on an input signal, so that a desired light amount is directed toward a pupil 46a of a projection optics 46, the SLM 44 for performing the deflection angle holding operation or the oscillation operation of each deflecting mirror under the control of the control unit 45; and for reflecting light (illumination light) incident to each deflecting mirror, the projection optics 46 for projecting the light reflected from the SLM 44, and the like. The deflecting mirror is referred to also as a mirror element.

Additionally, as will be described in detail below, in this projection device the light source 41 and/or the illumination optical functional assembly 42 are configured so that the intensity distribution or the average light amount of illumination light becomes non-uniform within a range of an incident NA (Numerical Aperture) to each deflecting mirror (44a, etc.) of the SLM 44; and/or the cross section of illumination light flux takes a shape other than the shape of the cross section of a solid circle centering on the optical axis of the illumination light, within that range.

Furthermore, display system (1) shows the light source 41 projects a light to the mirror 43 for reflecting the light to the SLM 44 controlled by the control unit 45 to deflect the incident light to the iris 46a of the projection optics 46.

In FIGS. 2 and 3, display configurations (2) to (5) schematically show a partial configuration of the projection device according to this embodiment. However, the mirror operational state representing the angular positions of a deflecting mirror, e.g., 44a in (2) to (5), differs from that in projection configuration (1).

More specifically, the mirror operational state in (1) of FIGS. 2 and 3 represents the operational state of the deflecting mirror 44a when the optical axis of light reflected on the deflecting mirror 44a matches that of the projection optics 46.

The mirror operational state in (2) of FIG. 2 represents the operational state of the deflecting mirror 44a when the optical axis of light reflected on the deflecting mirror 44a inclines by an angle $\square_1$ from the optical axis of the projection optics 46 toward the right side of FIG. 2 in parallel to the paper plane of this figure.

The operational state of the mirror operational state in (3) of FIGS. 2 and 3 represents the operational state of the deflecting mirror 44a when the optical axis of light reflected on the deflecting mirror 44a inclines by an angle $\square_2$ ($\square_1 \leq \square_2$) from the optical axis of the projection optics 46 toward the right side of FIGS. 2 and 3 in parallel to the paper planes of the figures.

The mirror operational state in (4) of FIGS. 2 and 3 represents the operational state of the deflecting mirror 44a when the optical axis of light reflected on the deflecting mirror 44a inclines by an angle $\square_3$. ($\square_1 \leq \square_3$) from the optical axis of the projection optics 46 toward the right side of FIGS. 2 and 3 in parallel to the paper planes of the figures.

The mirror operational state in (5) of FIG. 3 represents the operational state of the deflecting mirror 44a when the optical axis of light reflected on the deflecting mirror 44a inclines by an angle $\square_1$ from the optical axis of the projection optics 46 toward the depth side of FIG. 3 vertically to the paper plane of this figure.

Namely, (2), (3), (4), and (5) show the deflected light from the SLM 44 as the deflecting mirror 44a of the SLM 44 is moving to different deflecting angles.

Additionally, (1) represents a fully ON position where the entire incident light is projected onto the iris 46a of the projection optics 46 for image display while (2), (3), and (5) represent intermediate states, and (4) represents a fully OFF position.

Refer to (A-1) to (A-4) shown in FIG. 2 for the light intensity distribution at the iris 46a where the incident light has a circular shape as that shown in (A-1) when the deflecting mirror 44a of the SLM 44 is at an fully ON position. The shapes of the projection light at the iris 46a gradually change as the deflecting mirror 44a of the SLM 44 oscillates to different angular positions as shown in (A-2), (A-3), and (A-4) while the light intensity variations are shown in (A-ML) in FIG. 2 as the deflecting mirror 44a of the SLM 44 moves to a different position according to that shown in (A-1) to (A-4), from a fully ON position to a fully OFF position.

(A-1) to (A-4) represent a reflection light flux from the deflecting mirror 44a, and the pupil 46a in the mirror statuses in (1) to (4), and represent the cross section of the reflection light flux with a thick line. (A-1) and (A-2) also represent the intensity distribution of light on the cross section of the reflection light flux, and shade a range included in the pupil 46a. The examples shown in (A-1) to (A-4) are those implemented when light is incident to the deflecting mirror 44a, when 1) the cross section of the reflection light flux matches the pupil

46a in the position of pupil 46a in the mirror operational state of (1), and 2) a distribution 47, which is a normal distribution as the intensity distribution of light in that position, is obtained as shown in (A-1). Here, the intensity distribution 47 is also a distribution that is non-uniform in a direction nearly parallel to the moving direction of the optical axis of the reflection light, which varies with a change in the mirror status. (A-ML) represents the light intensity in the pupil 46a when the mirror operational state is changed from (1) to (4).

Refer to (B-1) to (B-4) shown in FIG. 2 for incident light of a non-circular oval shape. (B-ML) shown in FIG. 2 clearly shows that the light intensity now has a different distribution than that shown in (A-ML). Therefore, by changing the shape of the incident light, light intensity distribution, as the deflecting mirror 44a is moved to different angular positions, can be adjusted.

Similarly, (B-1) to (B4) represent a reflection light flux from the deflecting mirror 44a, and the pupil 46a in the mirror statuses respectively in (1) to (4), and represent the cross section of the reflection light flux with a thick line. Additionally, (B-1) and (B-2) represent the intensity distribution of light on the cross section of the reflection light flux, and shade a range included in the pupil 46a. The examples in (B-1) to (B4) are those implemented when light is incident to the deflecting mirror 44a, when 1.) the cross section of the reflection light flux has an elliptical shape including the pupil 46a in the position of the pupil 46a in the mirror operational state of (1), 2.) its longer axis direction is parallel to the moving direction of the optical axis of the reflection light, which varies with a change in the mirror status, and 3.) a distribution 48, which is a normal distribution as the intensity distribution of light in the position of the pupil 46a, is obtained as shown in (B-1). Here, the intensity distribution 48 is also a distribution that is non-uniform in a direction nearly parallel to the moving direction of the optical axis of the reflection light, which varies with a change in the mirror status. (B-ML) represents the light intensity within the pupil 46a when the mirror operational state is changed from (1) to (4) in this example. As indicated by (B-ML), the inclination of light intensity, which varies with a change in the mirror operational state, can be decreased, and the range of the deflection angle of the deflecting mirror for reflection light from the micromirrors can be expanded. As a result, the degree of change in the light intensity when the deflection angle of the mirror fluctuates due to variations in the manufacturing of a component (such as a hinge, etc.) that configures the deflecting mirror can be reduced. Accordingly, the projection apparatus may be operated with a less stringent precision in controlling deflecting mirror.

Similarly, in (C-1) to (C-4) shown in FIG. 2, the incident light intensity has a non-symmetrical distribution, and the projection light intensity as shown in (C-ML) in FIG. 2 has different variations when the deflecting mirror 44a is moved through the intermediate states between the fully ON and fully OFF position. This incident light intensity distribution allows an additional oscillation control period because of the lower image light intensity in the intermediate states. The incident light intensity distribution thus enables additional intermediate state gray scales control flexibility for a greater number of gray scales.

In a similar manner, (C-1) to (C-4) represent a reflection light flux from the deflecting mirror 44a, and the pupil 46a in the mirror statuses respectively in (1) to (4), and represent the cross section of the reflection light flux with a thick line. Additionally, (C-1) and (C-2) represent the intensity distribution of light on the cross section of the reflection light flux, and shade a range included in the pupil 46a. The examples shown in (C-1) to (C-4) are those implemented when light is incident to the deflecting mirror 44a, when 1) the cross section of the reflection light flux matches the pupil 46a in the position of the pupil 46a in the mirror operational state of (1), and 2) a distribution 49, which inclines toward the optical axis direction of the reflection light in the mirror operational state of (4), is obtained as the intensity distribution of light in that position as shown in (C-1). Here, the intensity distribution 49 is also a distribution that is non-uniform in a direction nearly parallel to the moving direction of the optical axis of the reflection light, which varies with a change in the mirror status. (C-ML) represents the light intensity in the pupil 46a when the mirror operational state is changed from (1) to (4). As described above, the intensity distribution of light is inclined like the distribution 49, whereby an intermediate amount of light can be obtained by slightly inclining the deflecting mirror 44a from the mirror operational state of (1) toward the mirror operational state of (4). A high intensity point of the intensity distribution of light further moves away from the pupil 46a as shown in (C-4) in the mirror operational state of (4), thereby enabling the contrast at the time of the fully OFF position to be improved.

(D-1) to (D-4) shown in FIG. 2 shows the incident light has an intensity distribution of an irregular double-eye shape, and the light intensity variations as shown in (D-ML) in FIG. 2 has a different variation as the deflecting mirror 44a of the SLM 44 is oscillating from the fully ON to the fully OFF position.

Similarly, (D-1) to (D-4) represent a reflection light flux from the deflecting mirror 44a, and the pupil 46a in the mirror statuses respectively in (1) to (4), and represent the cross section of the reflection light flux with a thick line. Additionally, (D-1) and (D-2) represent the intensity distribution of light on the cross section of the reflection light flux, and shade a range included in the pupil 46a. The examples shown in (D-1) to (D-4) are those implemented when light is incident to the deflecting mirror 44a when 1) the cross section of the reflection light flux takes the shape where two ellipses are arranged in series in the moving direction of the optical axis of the reflection light (which varies with a change in the mirror status) in the position of the pupil 46a in the mirror operational state of (1), and 2) a distribution 50, where high intensity mountains are arranged in series in the moving direction of the optical axis of the reflection light (which varies with a change in the mirror status), is obtained as the intensity distribution of light in the position of the pupil 46a in accordance with the shape of the cross section of the reflection light flux as shown in (D-1). Here, the longer axis direction of the cross section of the reflection light flux is vertical to the moving direction of the optical axis of the reflection light, which varies with a change in the mirror status. Additionally, the intensity distribution 50 is also a distribution that is non-uniform in the direction nearly parallel to the moving direction of the optical axis of the reflection light, which varies with a change in the mirror status. (D-ML) represents the light intensity in the pupil 46a when the mirror operational state is changed from (1) to (4) in this example. The intensity distribution of light is implemented as the distribution 50 as described above, whereby an inflection point is provided in the change of the light intensity, and the change of the light intensity becomes subtler in the vicinity of the inflection point. As a result, a stable intermediate light amount can be obtained.

From these examples, it is clearly illustrated that by controlling the intensity distribution of the incident light, additional control can be achieved by adjusting the image display intensity to generate additional gray scales. As illustrated in each example, the control unit 45 enables multiple state control of defecting states of illumination light by the SLM 44, and the examples realize a greater number of gray scales projection by directing the desired light intensity onto optical path and utilizing the change of the incident light to optical path in a deflection process optimized as described previously. Please also note that the intensity distribution is shifted toward the OFF position so that less movement of the deflecting mirror 44*a* of the SLM 44 is required to achieve intermediate intensity. The peak of the light distribution is further from the iris 46*a* position, and this will improve the contrast at the OFF position. The peak of intensity is shifted toward the deflecting direction of the light axis. This will cause a change of curvature, and this change allows for an easier creation of the intermediate state.

Refer to (1), (5), (3), (4) shown in FIG. 3 for the projection of incident light for the projection device where the incident light has shapes and intensity distributions shown in (E-1), and (F-1) in FIG. 3, when the deflecting mirror 44*a* of the SLM 44 is at the fully ON position. (E-ML) and (F-ML) shown in FIG. 3 shows the display light intensity as the deflecting mirror 44*a* is moved from the fully ON position to the fully OFF position. Again, by adjusting and controlling the shapes and the intensity distribution of the incident light at the iris 46*a* of the projection optics 46, the image light intensity as shown in (E-ML) and (F-ML) can be controlled to generate a greater number of gray scales. The incident light intensity distribution is implemented with the assumption that the deflecting mirror 44*a* of the SLM 44 has an intermediate state located out of the moving plane of the light axis. (F-ML) illustrates that a control flexibility is provided to achieve a stable output of light.

In FIG. 3, (E-1), (E-5), (E-3), (E-4), and (F-1), (F-5), (F-3), (F-4) represent 1) a reflection light flux from the deflecting mirror 44*a*, and the pupil 46*a* in the mirror statuses of (1), (5), (3), and (4) respectively, and 2) the cross section of the reflection light flux with a thick line. Additionally, (E-1), (E-5), and (F-1), (F-5) represent the intensity distribution of light on the cross section of the reflection light flux, and shade a range included in the pupil 46*a*.

The examples shown in (E-1), (E-5), (E-3), and (E-4) are those implemented when light is incident to the deflecting mirror 44*a* when 1) the cross section of the reflection light flux matches the pupil 46*a* in the position of the pupil 46*a* in the mirror operational state of (1), and 2) a distribution 51, which is a normal distribution as the intensity distribution of light in that position, is obtained as shown in (E-1). Here, the intensity distribution 51 is also a distribution that is non-uniform in a direction nearly vertical to the moving direction of the optical axis of the reflection light, which varies with a change in the mirror operational state (a change between (1), (3), and (4)). (E-ML) represents the light intensity in the pupil 46*a* when the mirror operational state is changed to (5), (1), (3), and (4) in this example.

The examples shown in (F-1), (F-5), (F-3), and (F-4) are those implemented when light is incident to the deflecting mirror 44*a* when 1) the cross section of the reflection light flux takes a shape where two ellipses are arranged vertically to the moving direction of the optical axis of the reflection light (which varies with a change in the mirror status, a change between (1), (3), and (4)) and 2) a distribution 52 where high intensity mountains are arranged vertically to the moving direction of the optical axis of the reflection light (which varies with a change in the mirror status, a change between (1), (3), and (4)) is obtained as the intensity distribution of light in that position in accordance with the shape of the cross section of the reflection light flux as shown in (F-1). Here, the longer axis direction of the shape of the cross section of the reflection light flux is parallel to the moving direction of the optical axis of the reflection light, which varies with a change in the mirror operational state (a change between (1), (3), and (4)). Additionally, the intensity distribution 52 is a distribution that is non-uniform in a direction nearly vertical to the moving direction of the optical axis of the reflection light, which varies with a change in the mirror operational state (a change between (1), (3), and (4)). (F-ML) represents the light intensity in the pupil 46*a* when the mirror operational state is changed to (5), (1), (3), and (4). According to this example, a stable output of light can be obtained from the projection optics 46.

The examples shown in FIG. 3 are those implemented when the optical axis of the reflection light in the mirror operational state for obtaining an intermediate light amount is provided outside the moving plane of the optical axis of the reflection light, which varies with a change in the mirror operational state shown in the examples of FIG. 2.

Next, a configuration of the light source 41 and/or the illumination optical functional assembly 42 is described in detail. This configuration is intended to obtain the above described reflection light such that the intensity distribution of the cross section of light flux is non-uniform in the position of the pupil 46*a* of the projection optics 46, and/or the reflection light such that the cross section of the light flux takes a shape other than the shape of the cross section of a solid circle centering on the optical axis. This configuration also makes the intensity distribution or the average light amount of illumination light non-uniform within the range of an incident NA to each deflecting mirror (44*a*, etc.) of the SLM 44, or it is a configuration for giving the cross section of illumination light flux a shape other than the shape of the cross section of a solid circle centering on the optical axis of the illumination light within that range.

Figure 4:
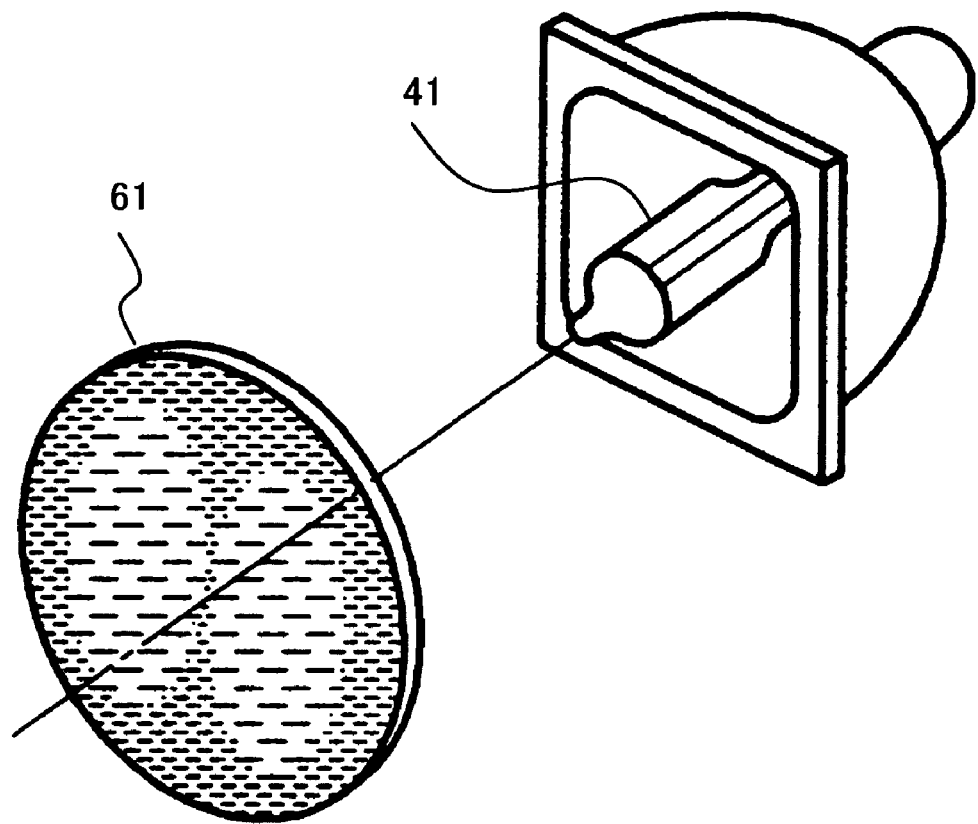
FIG. 4 shows a projecting device with non-uniform scattering or diverging characteristics at the image of illumination or around the illumination of the optical device.

Refer to FIG. 4 for an illustration of the projecting device where the scattering or the diverging characteristics of the optical device, as that located at the image of illumination or around the illumination, is non-uniform. "At the image of illumination" also includes the plane on which the light source image is formed, whereas "around the illumination" also includes the vicinity of the light source 41. FIG. 4 shows schematically the light source 41 and the optical element 61 included in the illumination optical functional assembly 42. The optical element 61, which is provided on the plane where the light source image is formed in the vicinity of the light source 41, is an optical element having a non-uniform diverging or scattering characteristic, and is, for example, a filter partially having a different transmittance, or the like. A non-uniform intensity distribution can be given to the illumination light by the illumination optical functional assembly 42 including an optical element such as 61.

Figure 5A:
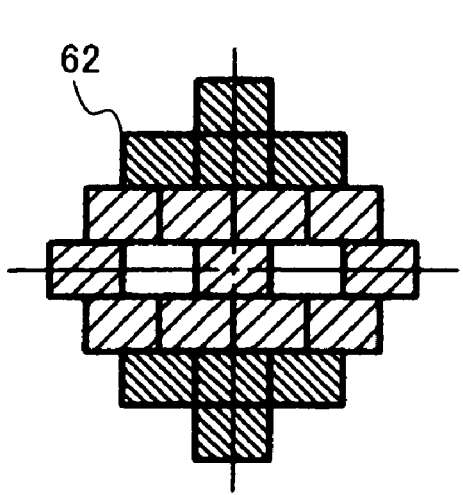
FIGS. 5A and 5B show a projection device where the illumination projection is from a fly-eye lens that includes multiple micro-lenses, and each micro-lens can be controlled or configured with different optical characteristics.
Figure 5B:
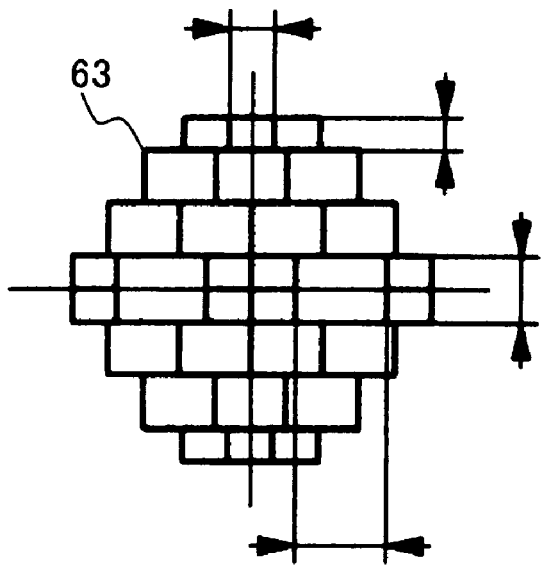

FIGS. 5A and 5B show the projection device where the illumination projection is from a fly-eye lens that includes multiple micro-lenses. Each micro-lens can be controlled or configured with different optical characteristics, e.g. reflectivity, deflecting angles, or degrees of light transmission, fill factor, etc. FIGS. 5A and 5B show schematically a fly-eye lens that is included in the illumination optical functional assembly 42, and is composed of a plurality of micro-lenses, including micro-lenses having different optical characteristics. FIG. 5A shows a fly-eye lens 62 composed of a plurality of micro-lenses including micro-lenses having a different transmittance, whereas FIG. 5B shows a fly-eye lens 63 composed of a plurality of micro-lenses, including micro-lenses having a different aperture ratio. Also, with the illumination optical functional assembly 42 including such a fly-eye lens, a non-uniform intensity distribution can be given to the illumination light.

Here, specific examples of the configuration of the illumination optical functional assembly 42 are described.

Figure 6A:
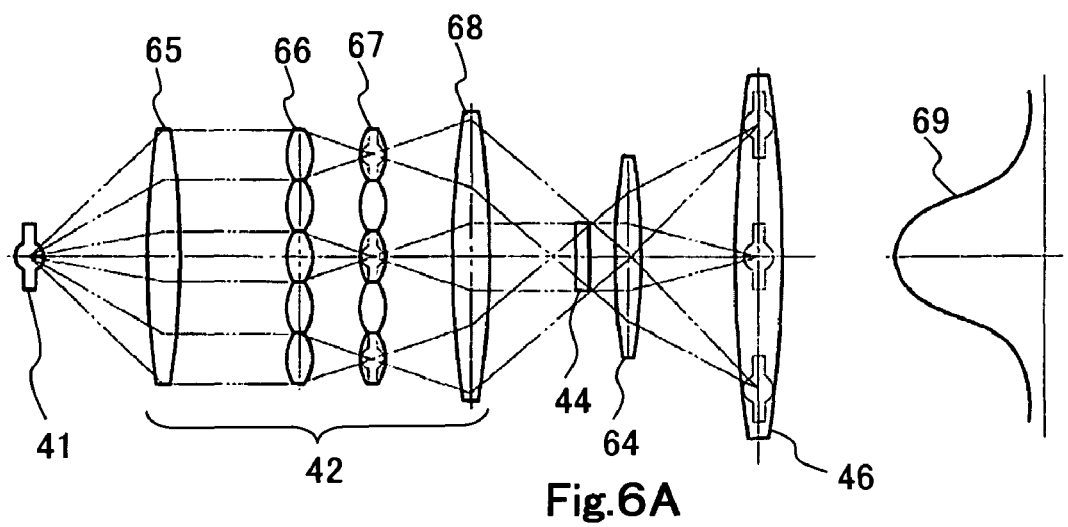
FIGS. 6A, 6B, and 6C illustrate specific examples of configurations for illumination optics functional assembly.
Figure 6B:
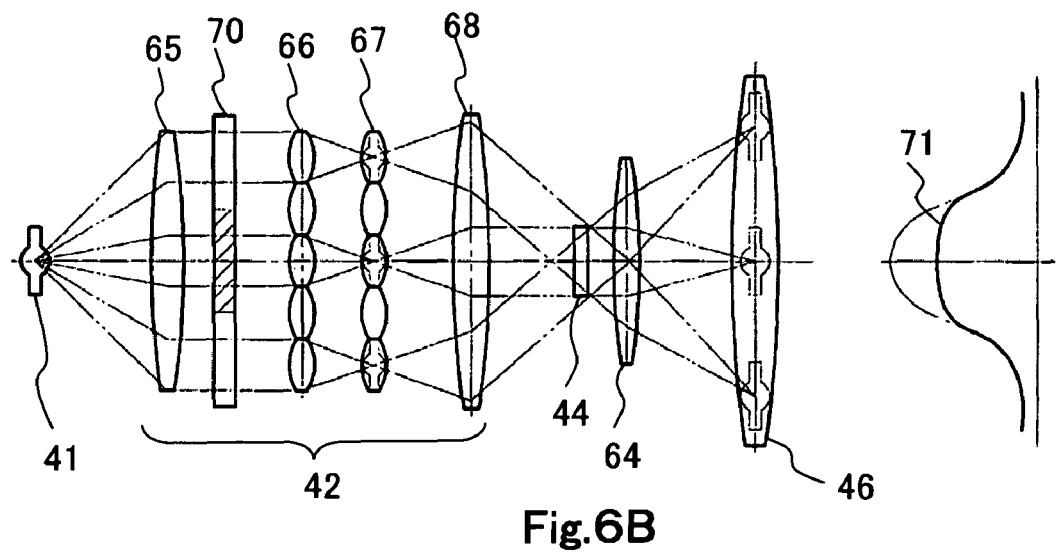
Figure 6C:
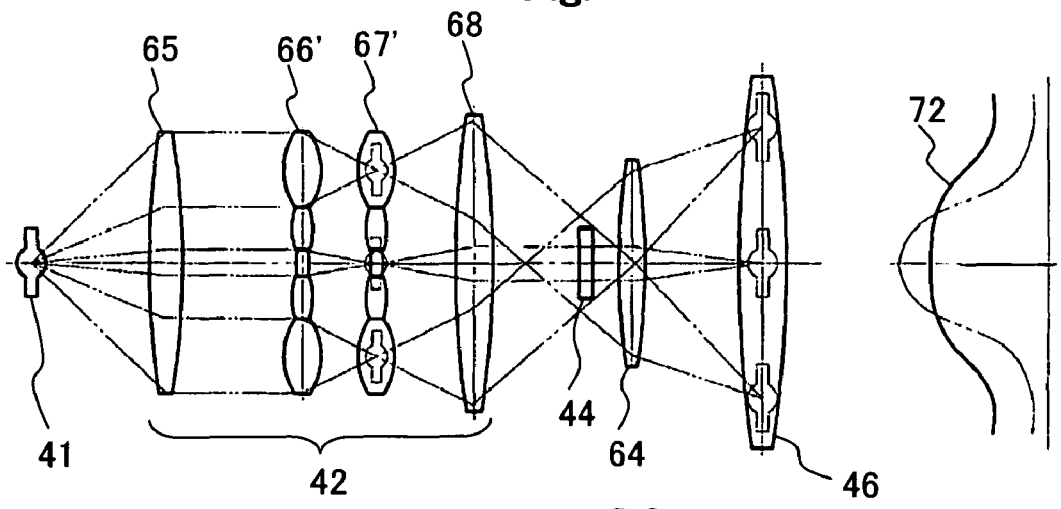

FIGS. 6A, 6B, and 6C show schematically a projection device according to this embodiment. FIGS. 6A to 6C depict light passing through the SLM 44, for the sake of convenience. Actually, however, light reflects on the SLM 44 as shown in FIGS. 2 and 3. Additionally, a condenser lens 64 is provided between the SLM 44 and the projection optics (projection lens) 46. This lens is omitted in FIGS. 2 and 3.

In the example configuration shown in FIG. 6A, the illumination optical functional assembly 42 comprises a condenser lens 65, fly-eye lenses 66 and 67, and an illumination lens 68. According to this example configuration, the intensity distribution of the cross section of light flux in the position of the pupil 46a of the projection optics 46 in the mirror operational state of (1) shown in FIGS. 2 and 3 becomes a distribution 69.

In the example configuration shown in FIG. 6B, the illumination optical functional assembly 42 comprises a condenser lens 65, a filter 70, fly-eye lenses 66 and 67, and an illumination lens 68. Specifically, the filter 70 is provided between the condenser lens 65 and the fly-eye lens 66, which are shown in FIG. 6A. The filter 70 is a filter and the shaded portion has a lower transmittance than the other portions. The filter 70 is also one example of the optical element 61 shown in FIG. 4. According to this example configuration, the intensity distribution of the cross section of the light flux in the position of the pupil 46a of the projection optics 46 in the mirror operational state of (1) shown in FIGS. 2 and 3 becomes distribution 71, and the amount of light in the central portion can be reduced in comparison with distribution 69 shown in FIG. 6A.

In the example configuration shown in FIG. 6C, the illumination optical functional assembly 42 comprises a condenser lens 65, fly-eye lenses 66' and 67', and an illumination lens 68. Namely, the illumination optical functional assembly 42 comprises the fly-eye lenses 66' and 67' having optical characteristics that are different from the fly-eye lenses 66 and 67 shown in FIG. 6A as their replacement. The optical characteristics of the plurality of micro-lenses that configure the fly-eye lens shown in FIG. 6A are the same, but the plurality of micro-lenses that configure the fly-eye lens shown in FIG. 6C include micro-lenses having a different optical characteristic (the number of apertures in the example of FIG. 6C). The fly-eye lenses 66' and 67' are also one example of the fly-eye lens 63 shown in FIG. 5B. According to this example configuration, the intensity distribution of the cross section of the light flux in the position of the pupil 46a of the projection optics 46 in the mirror operational state of (1) shown in FIGS. 2 and 3 becomes distribution 72, and its inclination can be decreased in comparison with distribution 69 shown in FIG. 6A.

Flexible control of incident light intensity distributions or shapes can be conveniently achieved. For example, the cross section of the light flux is asymmetrical around the axis of the light path, that is, in the part of the light path from the illumination through SLM 44 or from SLM 44 through a screen for displaying an image. Additionally, the cross section of light flux has a shape other than the shape of the cross section of a solid circle centering on the optical axis in at least a portion of the illumination light path extending from the light source 41 to the SLM 44, or the projection light path extending from the SLM 44 to the image display plane not shown. Thus, projection device may also be made to project incident light where the light intensity distribution is non-uniform and the illumination area is non-uniform, for producing the best images under different circumstances. (D-1) to (D-4) of FIG. 2 provides an example where the intensity distribution of the cross section of light flux is non-uniform and a radiation field is asymmetric.

The projection device according to this embodiment can be also configured to change the optical position of the light source 41.

Figure 7A:
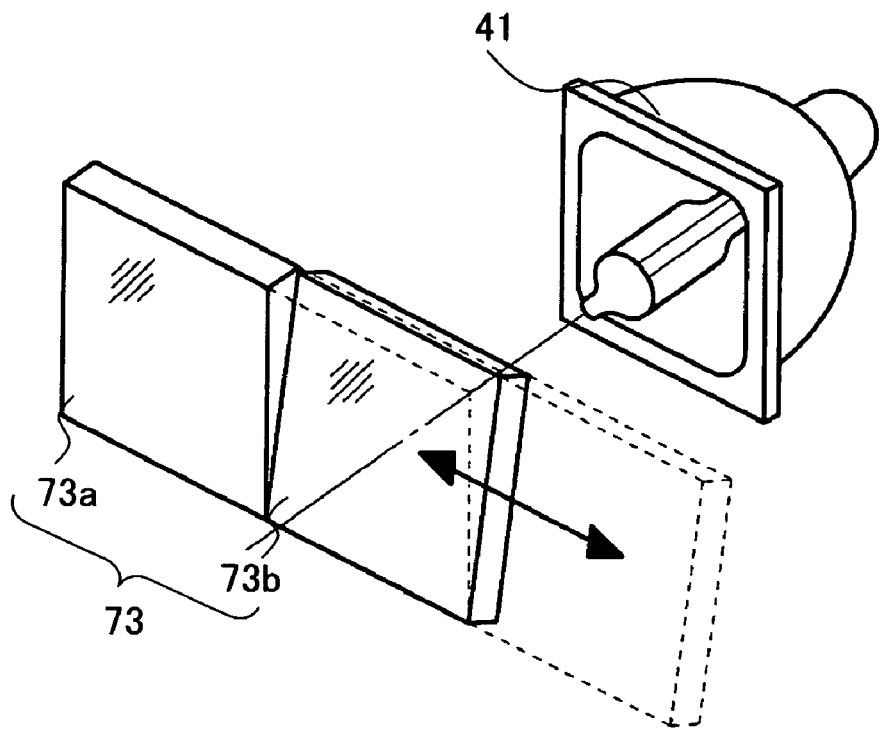
FIGS. 7A, 7B, 7C, 7D, and 7E illustrate an example configuration for changing the optical position of a light source.

FIGS. 7A, 7B, 7C, and 7E are diagrams showing an example configuration for changing the optical position of the light source 41. In this example configuration, the optical position of the light source 41 is changed by using a parallel flat plate 73 (73a, 73b). FIG. 7A shows the parallel flat plate 73, i.e., 73a and 73b may be flexibly installed and removable from the light path. The parallel flat plate 73 is configured as one piece by arranging, side by side, a parallel flat plate part 73a that is vertical to the light path, and a parallel flat plate part 73b that inclines by a predetermined angle from the parallel flat plate part 73a.

Figure 7B:
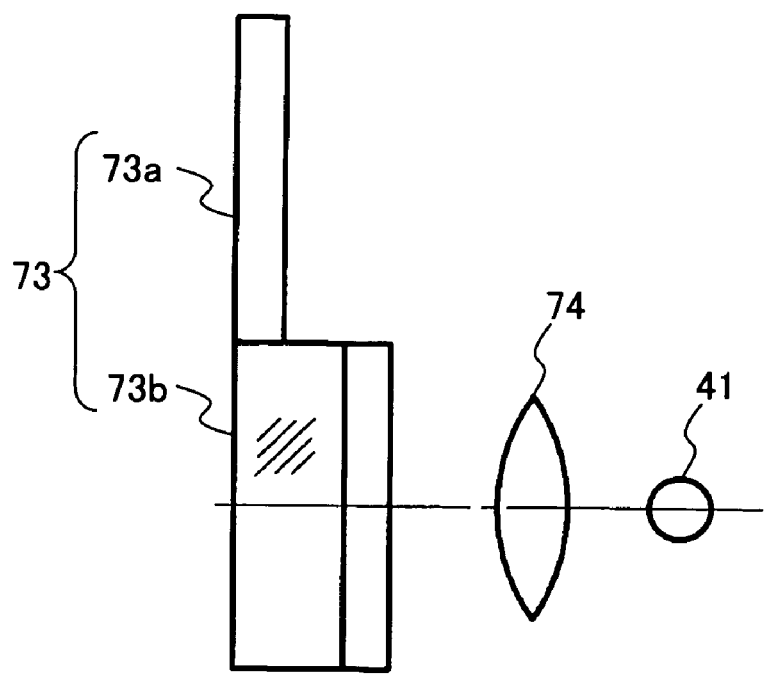
Figure 7C:
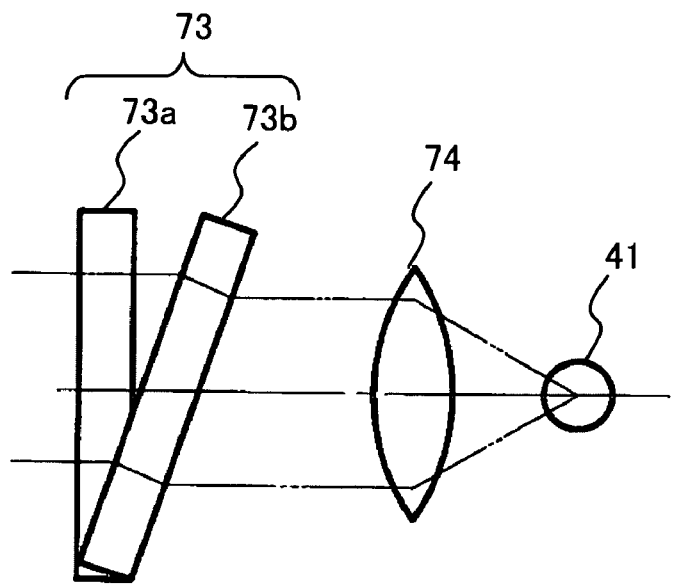
Figure 7D:
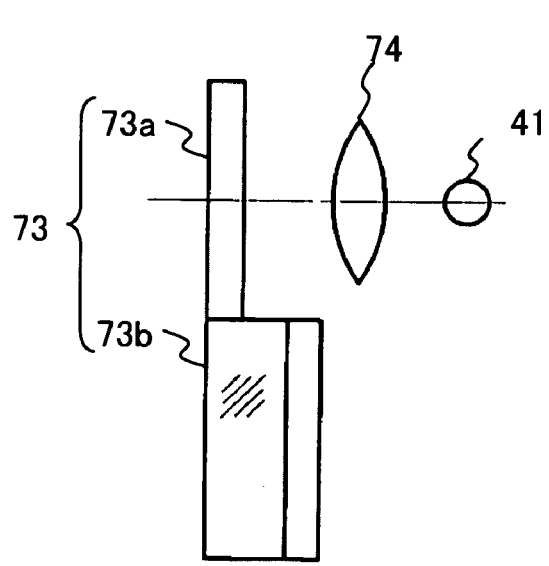
Figure 7E:
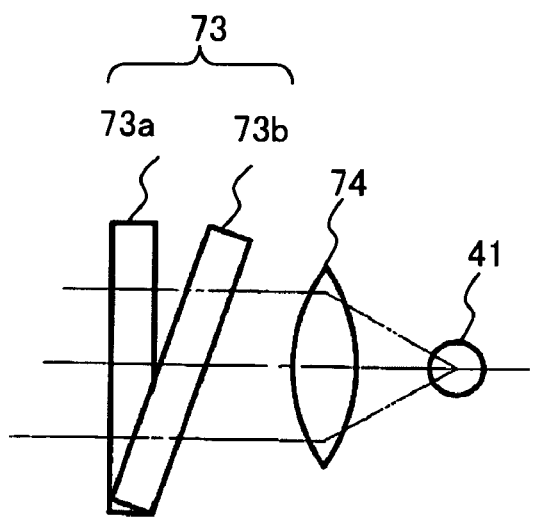

FIGS. 7A, 7B, and 7C show the state where the parallel flat plate part 73b is inserted in the light path and the parallel flat plate part 73a is removed from the light path. FIGS. 7D and 7E show the state where the parallel flat plate part 73a is inserted in the light path and the parallel flat plate part 73b is removed from the light path. FIGS. 7B and 7D are top views, whereas FIGS. 7C and 7E are side views. Additionally, a condenser lens 74 is provided between the light source 41 and the parallel flat plate 73 in FIGS. 7A, 7B, 7C, and 7D. However, this lens is omitted in FIG. 7A.

In such a configuration, the light path can be shifted, as shown in FIGS. 7E to 7C, by changing the parallel flat plate part inserted in the light path from 73a to 73b, thereby changing the optical position of light source 41. Additionally, the intensity distribution of the light flux incident to SLM 44 can be also controlled by changing the optical position of the light source 41 in this way.

Figure 8A:
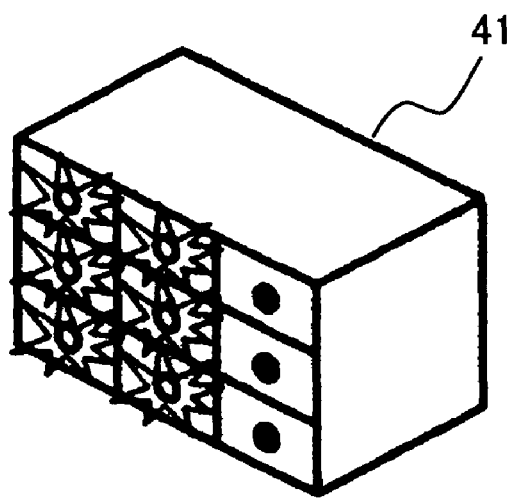
FIGS. 8A and 8B show a projecting device with control of the light intensity distribution of the incident light by an array of light emitting elements, with each light emitting element controlled to turn on or off in order to control the light intensity distributions.
Figure 8B:
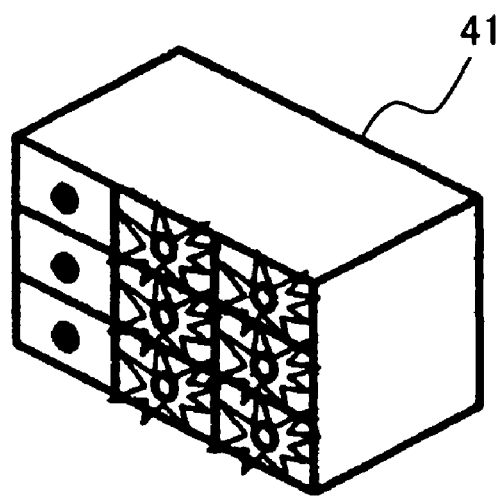

Refer to FIGS. 8A and 8B for an alternate example of a light source of this invention which controls the light intensity distribution of the incident light. The light source includes an array of light-emitting elements wherein each light emitting element is controlled to turn on or off in order to control the light intensity distributions.

FIGS. 8A and 8B show another example configuration for changing the optical position of light source 41. In this example configuration, the light source 41 is configured so that light emitting elements, which are a plurality of sub-light sources, are arranged in the form of an array, and the optical position of the light source 41 is changed by selecting a light emitting element made to emit light, and a light emitting element made not to emit light. The light emitting element may be implemented with a laser light source, an LED (Light Emitting Diode) light source, or other types of light sources.

FIG. 8A shows light source 41 when light emitting elements in two rows on the left side of a light emission plane emit light, and the remaining elements do not emit light. FIG. 8B shows light source 41 when light emitting elements in two rows on the right side of the light emission plane emit light, and the remaining elements do not emit light. Light emitting elements made to emit light, and light emitting elements made not to emit light are selected in this way, whereby the optical position of the light source 41 can be changed. Additionally, the intensity distribution of light flux incident to SLM 44 can also be controlled by changing the optical position of the light source 41 in this way.

Additionally, with a projection device according to this embodiment, the relationships between the mirror operational state and the light intensity, which are shown in FIGS. 2 and 3, can be also adjusted by 1) making the intensity distribution of illumination light uniform within the range of an incident NA to each deflecting mirror of the SLM 44, and 2) by giving the cross section of illumination light flux a shape other than the shape of the cross section of a solid circle centering on the optical axis of the illumination light. Specifically, the relationships can be adjusted only by making the shape of a radiation field different. An example where the shape of the radiation field is made different is by (B-1) to (B-4), and (D-1) to (D-4), which are shown in FIG. 2, and (F-1) to (F-4), which are shown in FIG. 3.

Furthermore, the projection device according to this embodiment can also be configured to create a plurality of illumination light fluxes.

Figure 9A:
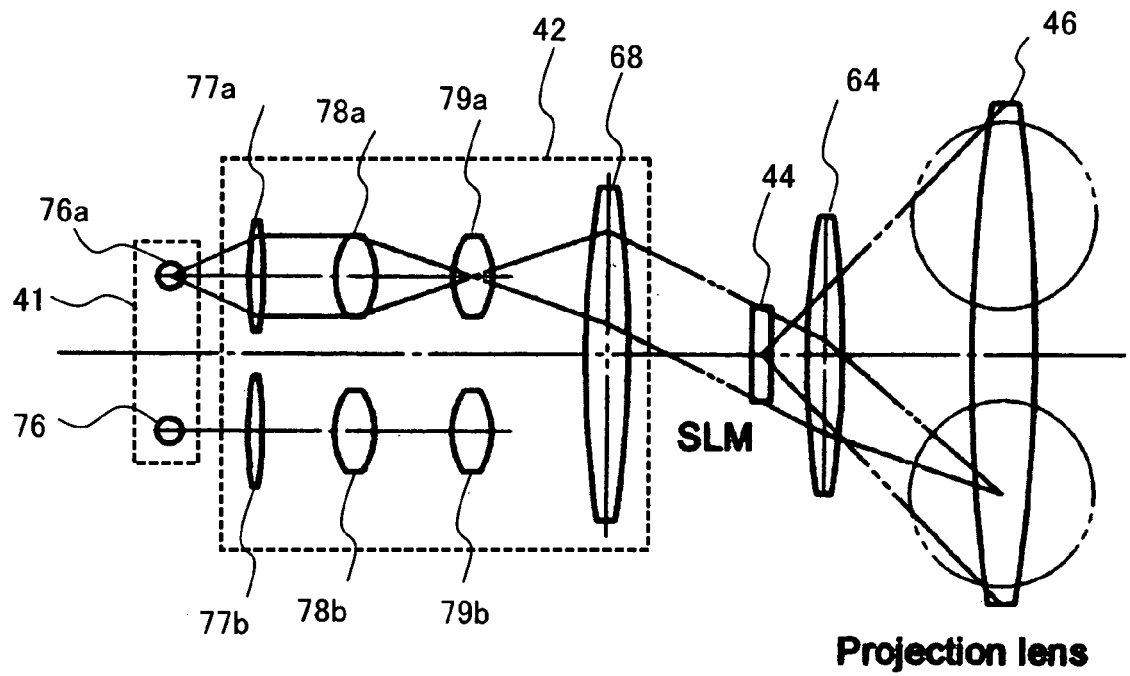
FIGS. 9A to 9C shows a projection device that employs one or several light sources to generate controllable light intensity distributions that can be non-uniform distributions at the iris of the projection optics.
Figure 9B:
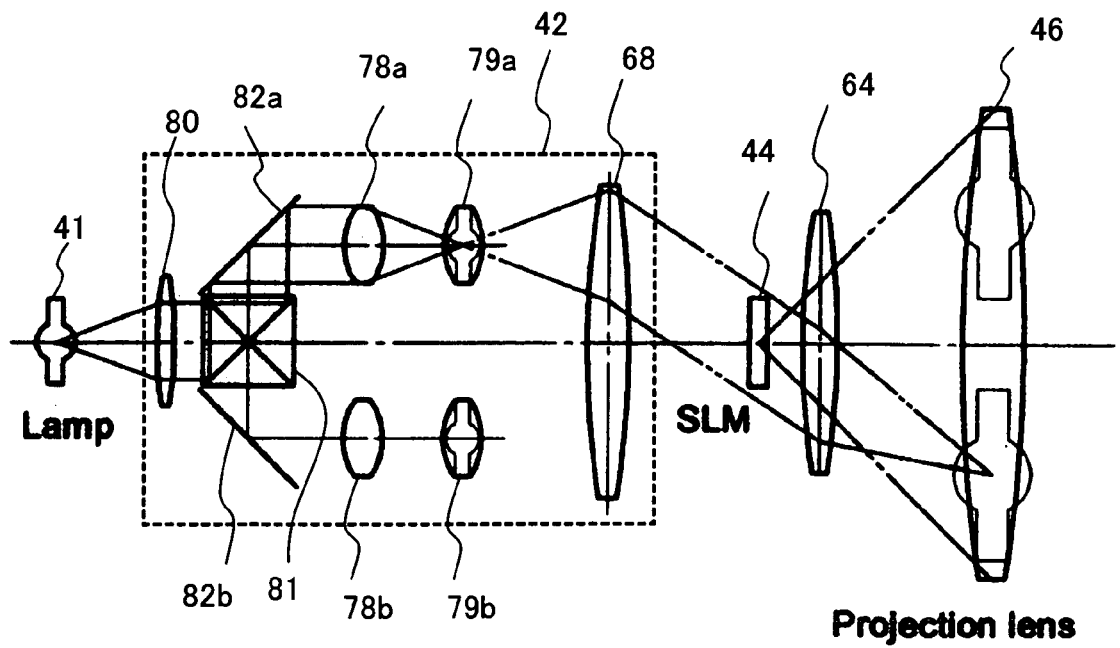
Figure 9C:
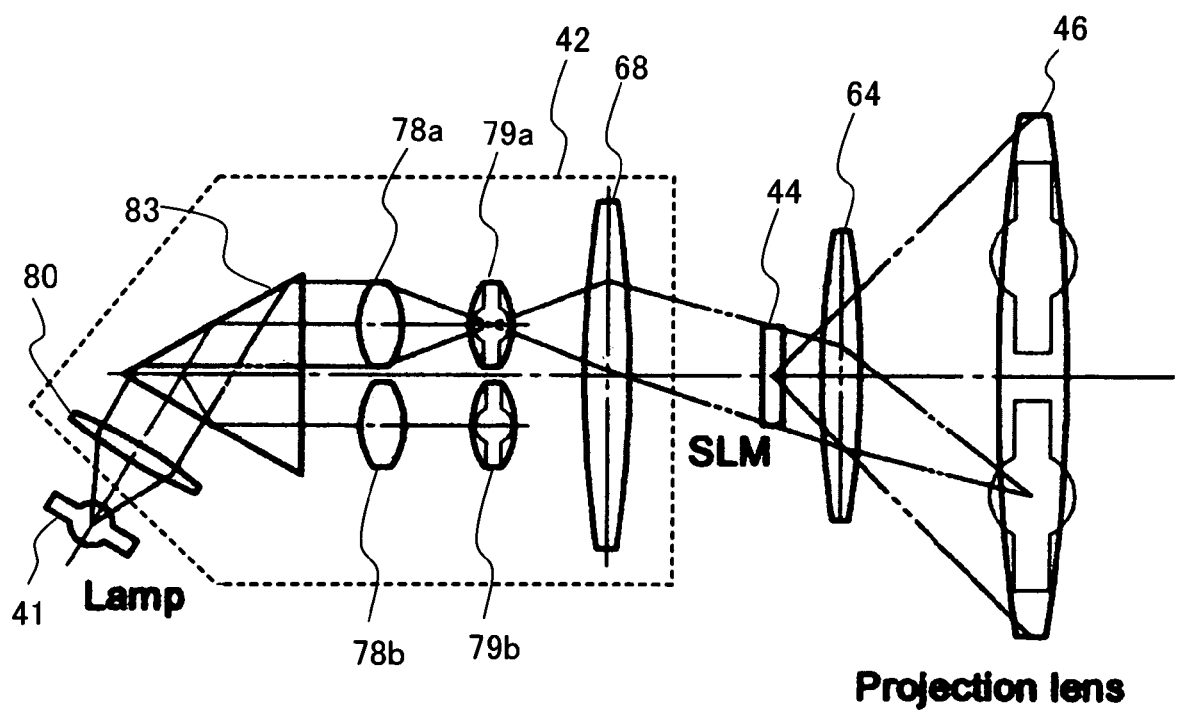

Refer to FIGS. 9A to 9C for the projection device that employs one or several light sources to generate controllable light intensity distributions that can be non-uniform distributions at iris 46*a* of the projection optics 46.

FIGS. 9A to 9C show configuration examples for making a plurality of illumination light fluxes exist. FIGS. 9A to 9C show light passing through SLM 44, for the sake of convenience. Actually, however, light reflects on the SLM 44 as shown in FIGS. 2 and 3. Additionally, in FIGS. 9A to 9C, a condenser lens 64 is provided between SLM 44 and the projection optics (projection lens) 46. In FIGS. 2 and 3, this lens is omitted.

In the example configuration shown in FIG. 9A, the light source 41 comprises two sub-light sources 76 (76*a*, 76*b*), and the illumination optical functional assembly 42 comprises two first condenser lenses 77 (77*a*, 77*b*), two second condenser lenses 78 (78*a*, 78*b*), two relay lenses 79 (79*a*, 79*b*), and an illumination lens 68. In this example configuration there are two illumination light fluxes, such as 1) an illumination light flux that passes through the first condenser lens 77*a*, the second condenser lens 78*a*, the relay lens 79*a*, and the illumination lens 68 from the sub-light source 76*a* and is incident to SLM 44, and 2) an illumination light flux that passes through the first condenser lens 77*b*, the second condenser lens 78*b*, the relay lens 79*b*, and the illumination lens 86 from the sub-light source 76*b* and is incident to the SLM 44. For this example configuration, as described above, the two illumination light fluxes are obtained from the two sub-light sources.

In the example configuration shown in FIG. 9B, the illumination optical functional assembly 42 comprises a first condenser lens 80, a light path separation element 81, two mirrors 82 (82*a*, 82*b*), two second condenser lenses 78 (78*a*, 78*b*), two relay lenses 79 (79*a*, 79*b*), and an illumination lens 68. In this example configuration, light, that is incident to the light path separation element 81 from the light source 41 after passing through the first condenser lens 80, is separated into two directions. There are two illumination light fluxes, such as 1) an illumination light flux in one direction, which passes through the second condenser lens 78*a*, the relay lens 79*a*, and the illumination lens 68 after reflecting on the mirror 82*a* and is incident to the SLM 44, and 2) an illumination light flux in the other direction, which passes through the second condenser lens 78*b*, the relay lens 79*b*, and the illumination lens 68 after reflecting on the mirror 82*b* and is incident to the SLM 44. In this way, two illumination light fluxes can be obtained by separating a light flux from a single light source into two.

In the example configuration shown in FIG. 9C, the illumination optical functional assembly 42 comprises a first condenser lens 80, a light path separation element 83, two second condenser lenses 78 (78*a*, 78*b*), two relay lenses 79 (79*a*, 79*b*), and an illumination lens 68. In this example configuration, light that passes through the first condenser lens 80 from the light source 41, and is incident to the light path separation element 81, is separated into two directions. There are two illumination light fluxes, such as 1) an illumination light flux in one direction, which passes through the second condenser lens 78*a*, the relay lens 79*a*, and the illumination lens 68 and is incident to the SLM 44, and 2) an illumination light flux in the other direction, which passes through the second condenser lens 78*b*, the relay lens 79*b*, and the illumination lens 68 and is incident to the SLM 44. In this way, two illumination light fluxes can be obtained by separating a light flux from a single light source into two.

Refer to FIGS. 9A to 9C for exemplary configuration for projecting two illumination light fluxes. A configuration with three or more illumination light fluxes can also be implemented. Additionally, each of a plurality of existing illumination light fluxes can also be made to differ in one frequency or more, an intensity distribution, and the shape of the cross section of light flux.

SLM 44 includes a plurality of deflecting mirrors controllable to oscillate between ON-OFF positions with intermediate states in order to coordinate with the incident light intensity distributions. This generates multiple controllable gray scales to optimize the visual effects of the image display.

Figure 10A:
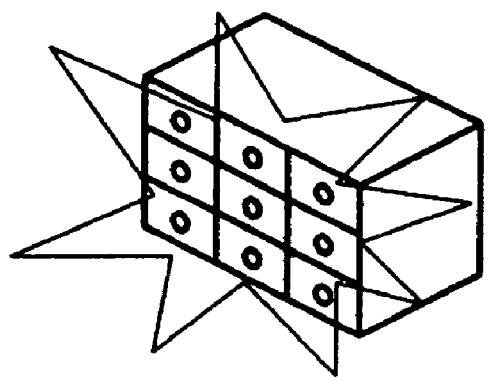
FIGS. 10A, 10B, and 10C illustrate an example configuration of a light source when a plurality of illumination light fluxes are obtained from a plurality of sub-light sources.
Figure 10B:
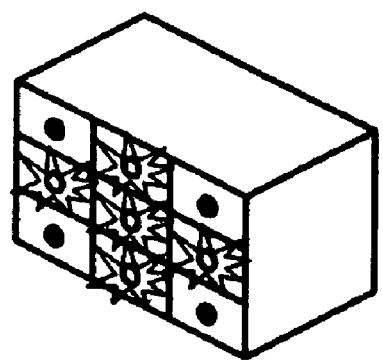
Figure 10C:
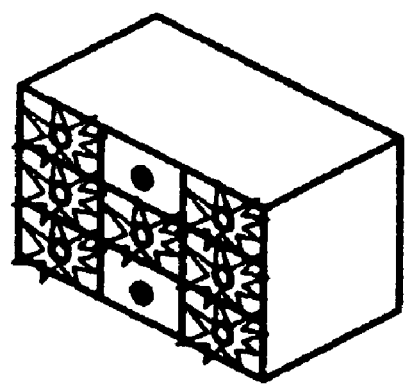

Refer to FIGS. 10A, 10B, and 10C for an exemplary configuration of the light source 41 for projecting a plurality of illumination light fluxes from a plurality of sub-light sources. If a plurality of illumination light fluxes are obtained from a plurality of sub-light sources as shown in the above described FIG. 9A, the plurality of illumination light fluxes can be also obtained by applying, as in the light source 41, 1) a light source having a configuration where a plurality of sub-light sources are arranged in the form of an array, and 2) by selecting sub-light sources made to emit light, and sub-light sources made not to emit light as shown in FIGS. 10A to 10C. The sub-light source is, for example, a laser light source, an LED light source, etc. Additionally, in this case, the intensity distribution of incident light flux can be also made non-uniform by changing the light emission amount of each of the sub-light sources.

In the light source unit composed of the plurality of sub-light sources shown in FIG. 10, the sub-light sources may be those emitting light of different frequencies, or those emitting light of the same frequency. In this case, if illumination lights emitted by adjacent sub-light sources are arranged to emit different primary colors, differences in the optical layout of each color can be reduced, and this is preferable. Additionally, the pattern of the light emission or the non-light emission of the sub-light sources is configured to be arbitrarily changeable. A light-up pattern can be determined so that sub-light sources emitting light are arranged, for example, symmetrically or asymmetrically with the optical axis. Additionally, if a selection of such a light emission pattern is configured to be arbitrarily switchable during a display control period, more detailed gray scale reproduction can be obtained. For example, with a so-called color sequential display method for configuring a color image by sequentially displaying images of different colors within one frame, an individual gray scale reproduction characteristic can be obtained by changing the light emission pattern of a light source unit for each color. Also, the light emission intensity may be changed in addition to a change made to the light emission pattern.

More Specifically, it is important to reduce the light emission plane of the light source unit, which is composed of a plurality of sub-light sources, to a minimum of area for the purpose of increasing the use efficiency of light. For this reason, the light source is preferably implemented with a semiconductor laser or a similar light emitting device. Additionally, the light source unit may have the output planes of an optical transmission guide such as an optical fiber, etc., for transmitting the illumination light from the light source configured in the form of a matrix. The number of light sources is not required to match the number of the output planes of the optical guide. The optical transmission guide may further comprise optical synthesizer or separator. Preferably, the area of the light emission plane of the light source unit is configured to be equal to or smaller than 5 $mm^2$ in order to efficiently achieve the object of the present invention without unnecessarily increasing the area of the light source, and without decreasing the intensity of projection light to the light modulator.

Furthermore, if a plurality of lasers is used for light source, the optical length from each laser to the SLM can be different from each other and the timing of each laser pulse is staggered in order to reduce speckle noise.

As described above, the first embodiment of the present invention is the projection device using the deflecting type spatial light modulator for directing the illumination light from the light source toward the projection light path; it is implemented with 1) an illumination configuration where the intensity distribution in the position of the optical pupil of the projection light path of illumination light becomes non-uniform, and/or 2) an illumination configuration where the cross section of light flux in the position of the optical pupil of the projection light path of illumination light takes a shape other than the shape of the cross section of a solid circle centering on the optical axis, so that a change in the amount of light incident to the projection light path in the deflection process of the illumination light (which is performed by the deflecting type spatial light modulator) becomes preferable for intermediate gray scale reproduction.

With such a configuration, a finer intermediate gray scale light amount or a stable intermediate gray scale can be obtained by adjusting the change curve of the amount of output light, which varies with the change in angle of the deflecting mirror of the deflecting type spatial light modulator. Additionally, a predetermined amount of light is made incident to the projection light path by using a change in the amount of light incident to the projection light path in an optimized deflection process, whereby high gray scale projection can be implemented.

Second Embodiment

A projection device according to this embodiment comprises a light source, illumination optical functional assembly for collecting and directing light from the light source, a deflecting type spatial light modulator (hereinafter referred to simply as "SLM"), a projection light path for projecting the light modulated by the SLM, and controller for controlling the deflection angle holding operation and the oscillation operation of each deflecting mirror (mirror element) of the SLM, based on an input signal so that the desired amount of light is directed toward the optical pupil of the projection light path.

In the projection device according to this embodiment, the light source and/or the illumination optics functional assembly are configured so that the intensity distribution of illumination light in the position of the optical pupil of the projection light path becomes non-uniform. Additionally, the controller can control the deflecting mirror to hold a particular deflection angle in a first control period, and can control the deflecting mirror to oscillate in a second control period.

Furthermore, this projection device can increase or decrease the intensity of light incident to the SLM in at least one of the first and the second control periods, or in one or more sub-control periods when at least one of the first and the second control periods is further divided into two or more sub-control periods.

Figure 11:
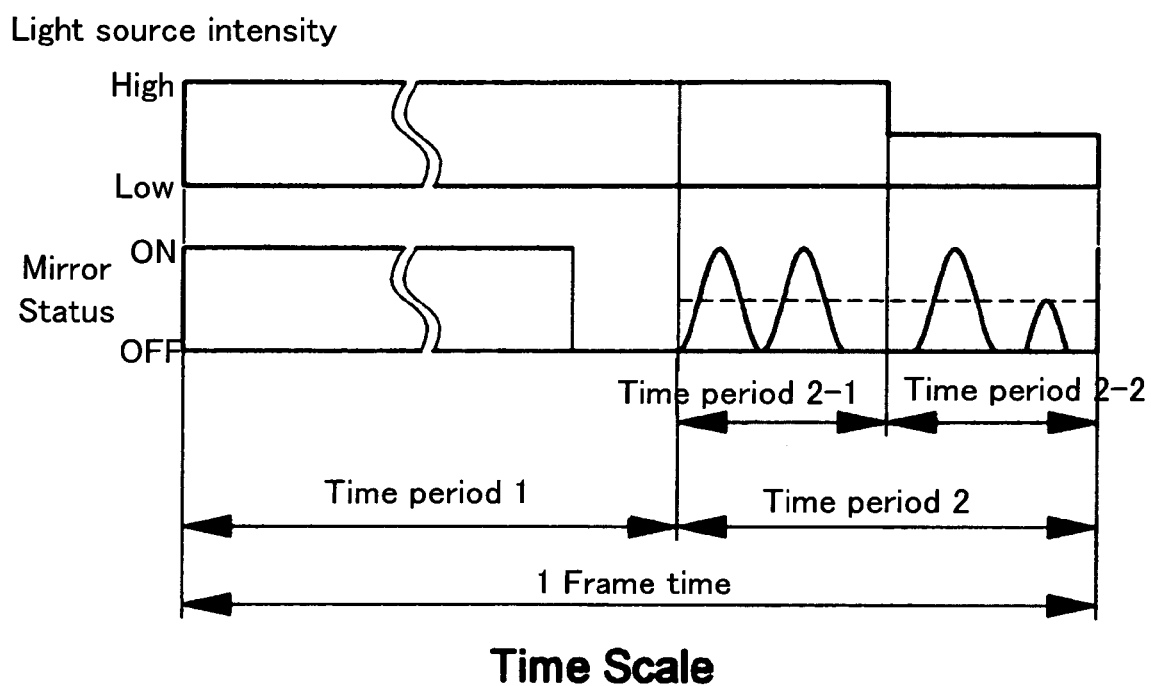
FIG. 11 shows another light source implemented with a controllable time modulated light collector.

FIG. 11 shows the second embodiment of this invention with the light source implemented with a light collector. The light intensity projected from the light source is controlled by controlling the light collecting characteristics by applying a time modulation between different periods. These time periods are shown as time period 1 and period 2 with two sub-periods shown as time period 2-1 and time period 2-2. Time modulation of the light collector enables a light intensity distribution that can be projected from the light source, and thus achieves the purpose of generating additional gray scales by controlling the incident light intensity distributions.

FIG. 11 shows an example of operations per time frame of the projection device according to this embodiment. In this figure, mirror operational state represents the operational state of one deflecting mirror in the SLM. Additionally, a time period 1 represents a first control period, a time period 2 represents a second control period, and time periods 2-1 and 2-2 represent two control periods when the second control period is divided into two sub-control periods.

In the example of the operations in this figure, light source intensity is controlled to be high in time period 1. Additionally, the deflection angle of the deflecting mirror is controlled so that the mirror operational state has an ON operational state in a predetermined time period within time period 1, and the deflection angle of the deflecting mirror is controlled so that the mirror operational state becomes OFF operational state in the rest of time period 1.

Additionally, in time period 2, the light source intensity is controlled to be high in time period 2-1, and controlled to be between high and low in time period 2-2. Additionally, the deflecting mirror is oscillation-controlled so that the mirror operational state becomes an oscillation operational state in time period 2. The deflecting mirror may be oscillation-controlled to reduce the oscillation amplitude of the deflecting mirror in time period 2-1 or 2-2.

As described above, the deflecting mirror is oscillation-controlled in time period 2 within 1 time frame, and not only the light source intensity but also the oscillation amplitude of the deflecting mirror is decreased in time period 2-2, into which time period 2 is arbitrarily divided, whereby finer intermediate gray scale representation can be made.

Here, control is easy if a time period when the light source intensity is increased or decreased is set to an integral that is a multiple of the natural period of the deflecting mirror. However, the intensity of the light source may be modulated, for example, in the time period required until output light stops its incidence to the pupil of the projection lens. This is within the time period from when the output light actually starts its incidence to the pupil of the projection lens until when the mirror element makes a transition to the OFF operational state via the ON operational state after starting to oscillate from the OFF status. More specifically, assuming that the natural period of the deflecting mirror is T, a similar effect can be obtained also by modulating the intensity of the light source during a time period from when ¼ of T almost elapses until when ¾ of T almost elapses after the time period 2-2 starts, namely, after the mirror element starts to oscillate. Furthermore, a control may be performed to turn the illumination light off in the time period from when the mirror element starts to oscillate until when ¼ of T elapses, and in the time period from when ¾ of T elapses until when T elapses. The control for turning the illumination light off in synchronization with the oscillation period is also applicable to the time period 2-1. As described above, the light source is turned off in the time period when the reflection light from the mirror element is not practically incident to the pupil of the projection lens. The modulation of the intensity of the light source light is controlled in the time period when the reflection light from the mirror element is incident to the pupil of the projection lens, in synchronization with the operational periods of the mirror element as described above. Therefore, the unnecessary reflection light can be prevented from being incident to the pupil of the projection lens, and the contrast of a projection image can be prevented from being degraded.

At the same time, gray scale control becomes easy and is theoretically preferable if the degree of decrease of the light source light in the time period 2-2 is set to 1/n (n is an integer) of the intensity of the light source, in the time period when the light source light is not modulated, namely, the time period 1 and the time period 2-1. However, the degree of decrease of light from the source light may be set based on the light amount desired to be obtained with the oscillation control of the mirror element.

In this embodiment, the degree of modulation of the light source light is implemented as two stages. However, the degree of modulation may be implemented as a plurality of modulation intensities including the above described OFF status. With such a configuration, finer gray scale reproduction can be obtained.

Additionally, the time period 2, when the mirror element is oscillation-controlled, is divided for light source modulation in the embodiment. However, the time period when ON/OFF of the mirror element is controlled may be divided for light source modulation. In this case, the time period when the light source modulation is made is equalized to the minimum time unit when the mirror is turned on; the time period when the light source modulation is made is provided separately from the time period of the ON/OFF control, when the light source light is not modulated, and the mirror element is turned on/off in the provided time period, so that gray scales can be increased. The degree of modulation of the light source light may be set depending on a required light intensity as described above.

For the above described modulation of the intensity of the light from the source light, it is preferable to use a light source that is superior in responsiveness, such as a laser light source, etc. Modulation of the intensity of the light source can also be obtained by changing the light emission pattern and the number of light emissions of the light source array shown in FIG. 10, in addition to the method for modulating the intensity or the light emission time of a single light source.

Additionally, with a so-called color sequential display method for configuring a color image by sequentially displaying images of different colors within one frame, 1 time frame shown in FIG. 11 is executed by being replaced with sub-frames of respective colors. That is, a time period when only one of the three primary colors is displayed is divided into first and second control periods, and the modulation of the intensity of the light source is made. At this time, modulations of the intensity of the light source, or the degree of modulation of the intensity, may be made different for each of the colors. For example, the intensity of the light source may be modulated only in the time period when the green color, having high human visual sensitivity, is displayed. Additionally, if one frame is configured with multiple repetitions of sub-sequences of the three primary colors within 1 time frame, modulation of the intensity of the light source, or the degree of modulation of the intensity, may be set in each sub-sequence in order to reduce the problem called "a color break."

Furthermore, if sub-light sources of two different primary colors are made to emit light simultaneously, the emitted lights can be used as complementary illumination light, with which the above described intensity modulations may be combined and controlled.

In the projection device according to this embodiment, the light source and/or the illumination optics functional assembly are configured to make the intensity distribution of illumination light, in the position of the optical pupil of the projection light path, non-uniform. However, the light source and/or the illumination optics functional assembly can also be configured, for example, to make the intensity distribution uniform. Also, with such a configuration, intermediate gray scale representation that is finer than in conventional techniques can be obtained.

Additionally, in the projection device according to this embodiment, in order to increase or decrease the intensity of light incident to the SLM, a variety of methods can be considered in addition to the method for increasing/decreasing the intensity of the light source as described above.

Figure 12A:
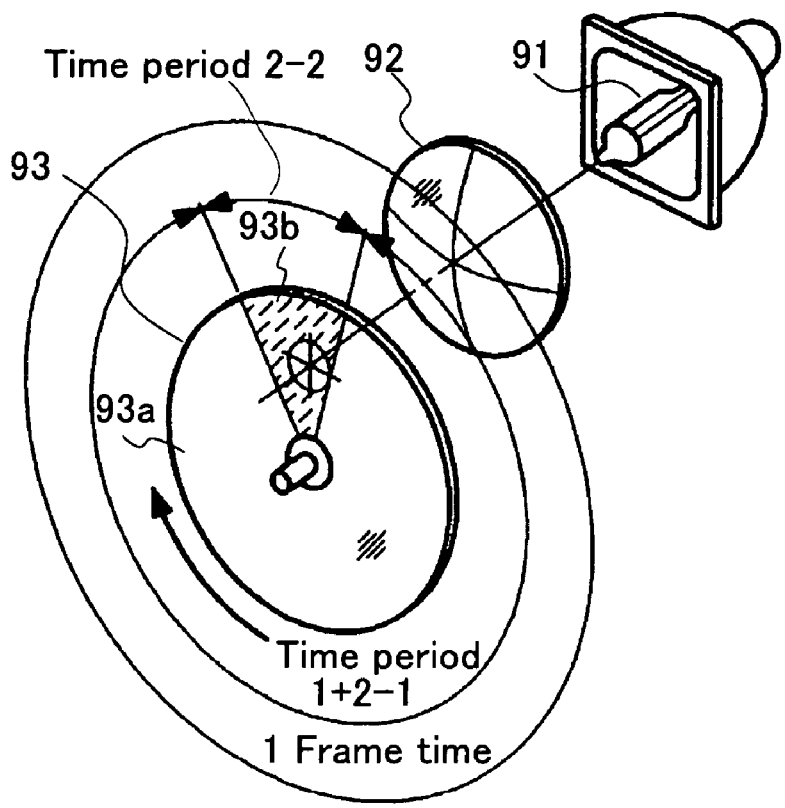
FIGS. 12A and 12B show a projection device that employs a rotational light attenuator to control the light intensity distribution.
Figure 12B:
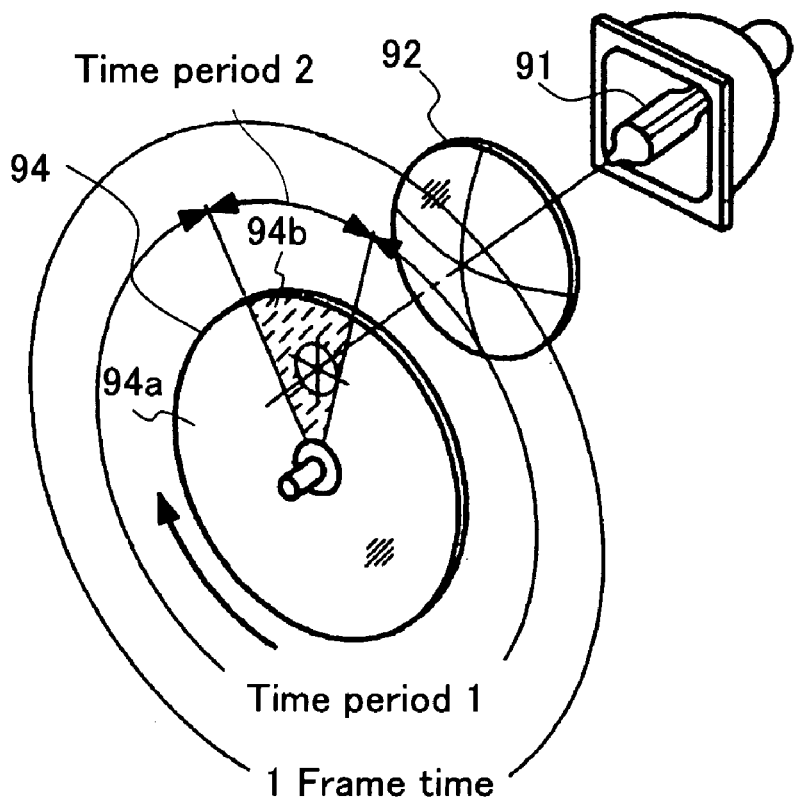

Refer to FIGS. 12A and 12B for a light projection device which employs a rotational light attenuator as a light intensity control mechanism. The rotational light intensity attenuator has different transmission indexes along different angular sections of a rotational wheel in order to control with flexibility the light intensity projected onto the SLM for image display.

In FIG. 12A, the by rotating the light intensity attenuator 93 the intensity of light incident to the SLM is increased or decreased. The rotational light intensity attenuator 93 makes one rotation in one time frame, and a portion of high transmittance (for example, a portion of transmittance of 100 percent) 93a is inserted in the light path in the time periods 1 and 2-1 shown in FIG. 11, and a portion of low transmittance (for example, a light attenuation element portion of transmittance of 50 percent) is inserted in the light path in the time period 2-2. As a result, the portion of high transmittance 93a or the portion of low transmittance 93b is inserted in/removed from the light path in synchronization with each control period, whereby the intensity of light incident to the SLM can be controlled in a similar manner as in the case shown in FIG. 11.

Additionally, if the intensity of light incident to the SLM is desired to be decreased not only in the time period 2-2 but also, for example, over the time period 2, the rotational light intensity attenuator can be also configured so that a portion of high transmittance 94a is inserted in the light path in the time period 1, and a portion of low transmittance 94b is inserted in the light path in the time period 2, as in the rotational light intensity attenuator 94 shown in FIG. 12B.

In FIGS. 12A and 12B, a condenser lens 92 is provided between the light source 91 and the rotational light intensity attenuator 93 or 94. Here, the condenser lens 92 and the rotational light intensity attenuator 93 or 94 are a portion of the illumination optics functional assembly.

Figure 13A:
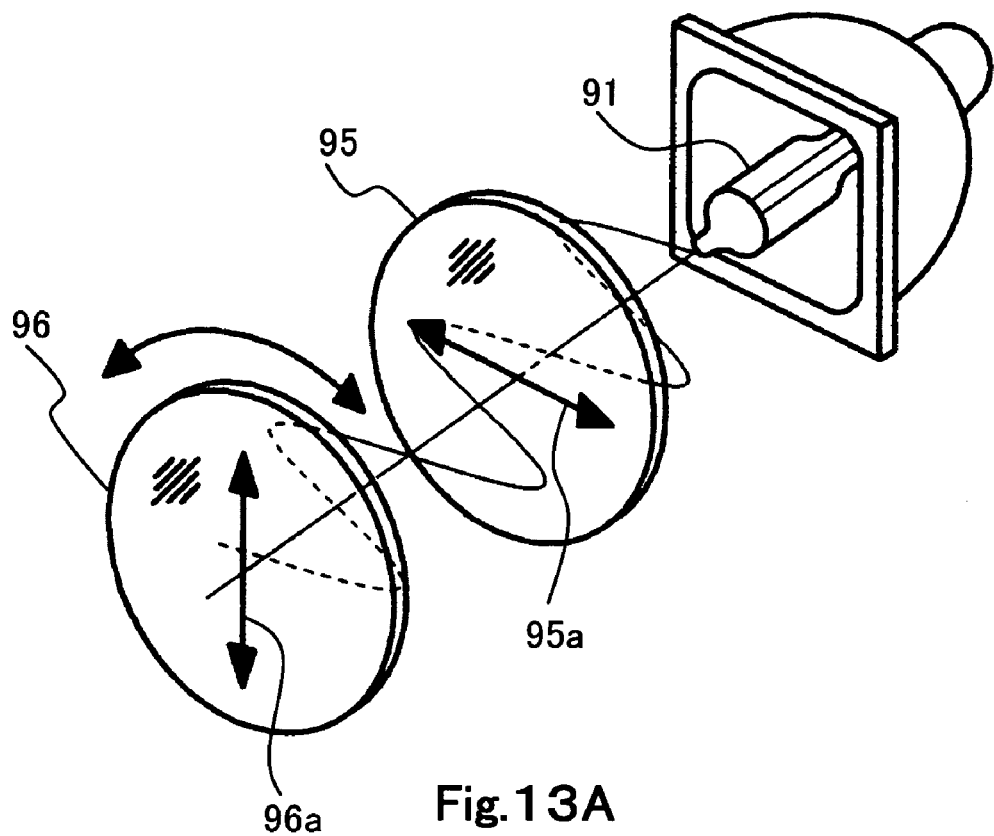
FIGS. 13A and 13B show a rotational polarizing lens with different polarization along vertical and horizontal axes to control the incident light intensity.
Figure 13B:
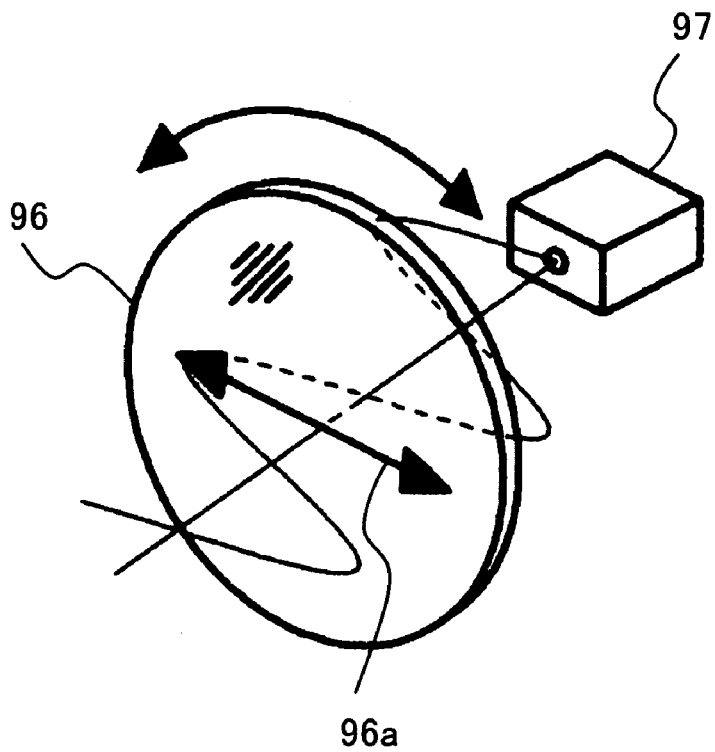

FIGS. 13A and 13B provide another example where the illumination optics functional assembly includes a rotational polarizing lens with different polarization along vertical and horizontal axes of the lens, such that by rotating the lens, variations of different light transmissions are achieved in order to control the incident light intensity.

In FIG. 13A, rotational polarizing lenses 95 and 96 are provided in the light path for increasing or decreasing the intensity of light incident to the SLM. The rotational polarizing lens 95 is fixed, whereas the rotational polarizing lens 96 may be controlled and rotated to different angular positions. Additionally, arrows 95a and 96a indicate the polarization directions of the light that passes through the rotational polarizing lenses. The light source 91 is a light source that emits incoherent light. With such a configuration, transmission light can be selected by rotating the rotational polarizing lens 96 in synchronization with each control period, and light of the desired intensity can be made incident to the SLM.

Additionally, if a light source that emits coherent light is used as the light source, the illumination optical functional assembly may be implemented with only the rotational polarizing lens 96 in the light path as shown in FIG. 13B. In FIG. 13B, a light source 97 is a laser light source that emits light, the polarization direction of which is horizontal.

In FIGS. 13A and 13B, the rotational polarizing lenses 95 and 96, or the rotational polarizing lens 96, are a portion of the illumination optics functional assembly.

Furthermore, in the projection device according to this embodiment, the light source can be also implemented to have an array of plurality of sub-light sources for increasing or decreasing the intensity of light incident to the SLM. The sub-light source is, for example, a laser light source, an LED light source, etc. In this case, the intensity of light emission of each of the sub-light sources is changed in synchronization with each control period, whereby light of a desired intensity can be made incident to the SLM.

As described above, the second embodiment according to the present invention is configured to obtain more micro-output light by providing the control period (the second control period when the above described oscillation-control is performed) for making intermediate gray scale reproduction with changes in the amount of light incident to the projection light path in the deflection process of illumination light, and by further modulating the amount of illumination light.

With such a configuration, a finer intermediate gray scale light amount, or a more stable intermediate gray scale can be obtained. Additionally, the desired light amount can be made incident to the projection light path by using a change in the amount of light incident to the projection light path in the deflection process of optimized illumination light, whereby projection with high gray scales can be implemented.

Furthermore, the change curve of the amount of output light, which varies with a change in the angle of the deflecting mirror of the SLM, is adjusted by making the intensity distribution in the position of the optical pupil of the projection light path of illumination light non-uniform, whereby a finer intermediate gray scale light amount or a stable intermediate gray scale can be obtained.

The projection device according to this embodiment can be also implemented to have an illumination configuration where the cross section of light flux in the position of the optical pupil of the projection light path of illumination light takes a shape other than the shape of the cross section of a solid circle centering on the optical axis, in a similar manner as in the first embodiment. Also, with such a configuration, a finer intermediate gray scale light amount or a stable intermediate gray scale can be obtained by adjusting the change curve of the amount of output light, which varies with the change in the angle of the deflecting mirror of the SLM. Additionally, if the projection device is configured as described above, it can be further configured to make the intensity distribution in the position of the optical pupil of the projection light path of the illumination light uniform.

As described above, according to the first and the second embodiments, the change curve of the amount of output light, which varies with a change in the angle of the deflecting mirror, is adjusted by 1) making the intensity distribution in the position of the optical pupil of the projection light path of the illumination light non-uniform, and/or 2) by giving the cross section of light flux in the position of the optical pupil of the projection light path of the illumination light a shape other than the shape of the cross section of a solid circle centering on the optical axis. Consequently, a finer intermediate gray scale light amount or a stable intermediate gray scale can be obtained, Furthermore, the amount of illumination light is further modulated by providing a control period (a control period when the oscillation-control of a mirror is performed) when intermediate gray scale reproduction is achieved with the use of a change in the amount of light incident to the projection light path in the deflection process of the illumination light, whereby a finer intermediate gray scale light amount or a stable intermediate gray scale can be obtained.

Third Embodiment

A projection apparatus according to the present embodiment includes a light source, an illumination optical system for condensing and orienting the light from the light source, a micromirror device for reflecting the light from the illumination optical system, a control unit for controlling the micromirror device based on an input signal, and a projection optical system for projecting the light reflected from the micromirror device.

The micromirror device includes a number of deflection mirror elements. Each of the deflection mirror elements includes 1.) a deflection mirror for reproducing gray scales by combining one or more of the following: a first deflection control state for reflecting the incident light from the light source to a first direction, a second deflection control state for reflecting the incident light to a second direction, and a third deflection control state for oscillating the mirror between the first deflection control state and the second deflection control state, 2.) an elastic and deflectable member for supporting the deflection mirror, and 3.) a drive electrode for driving the deflection mirror.

The projection optical system is provided on a light path reflected from the deflection mirror of the first deflection control state.

More specifically, the first deflection control state is a state for controlling the deflection mirror to produce maximum amount of output light from the projection optical system. The second deflection control state is a state for controlling the deflection mirror to turn off the output light from the projection optical system. The third deflection control state is a state for controlling the deflection mirror to oscillate between the first deflection control state and the second deflection control state.

The projection apparatus of such a configuration can be realized by the projection apparatus described with reference to FIG. 2 and FIG. 3. In this case, the light source, the illumination optical system, the micromirror device, the control unit, and the projection optical system, according to the present embodiment, correspond to the light source 41, the illumination optical functional assembly 42, the SLM 44, the control unit 45, and the projection lens 46, respectively. Also, the state of the deflection mirror controlled to the first and second deflection control states in the present embodiment corresponds to, e.g., the states of the deflection mirror 44a shown as (1) and (4) in FIG. 2. In addition, the state of the deflection mirror controlled to the third deflection control state corresponds to the state for oscillating the deflection mirror 44a between the states shown as (1) and (4).

Note that, in the projection apparatus according to the present embodiment, the ratio of the quantity of output light is variable by further changing the aperture ratio of the projection optical system.

Figure 14:
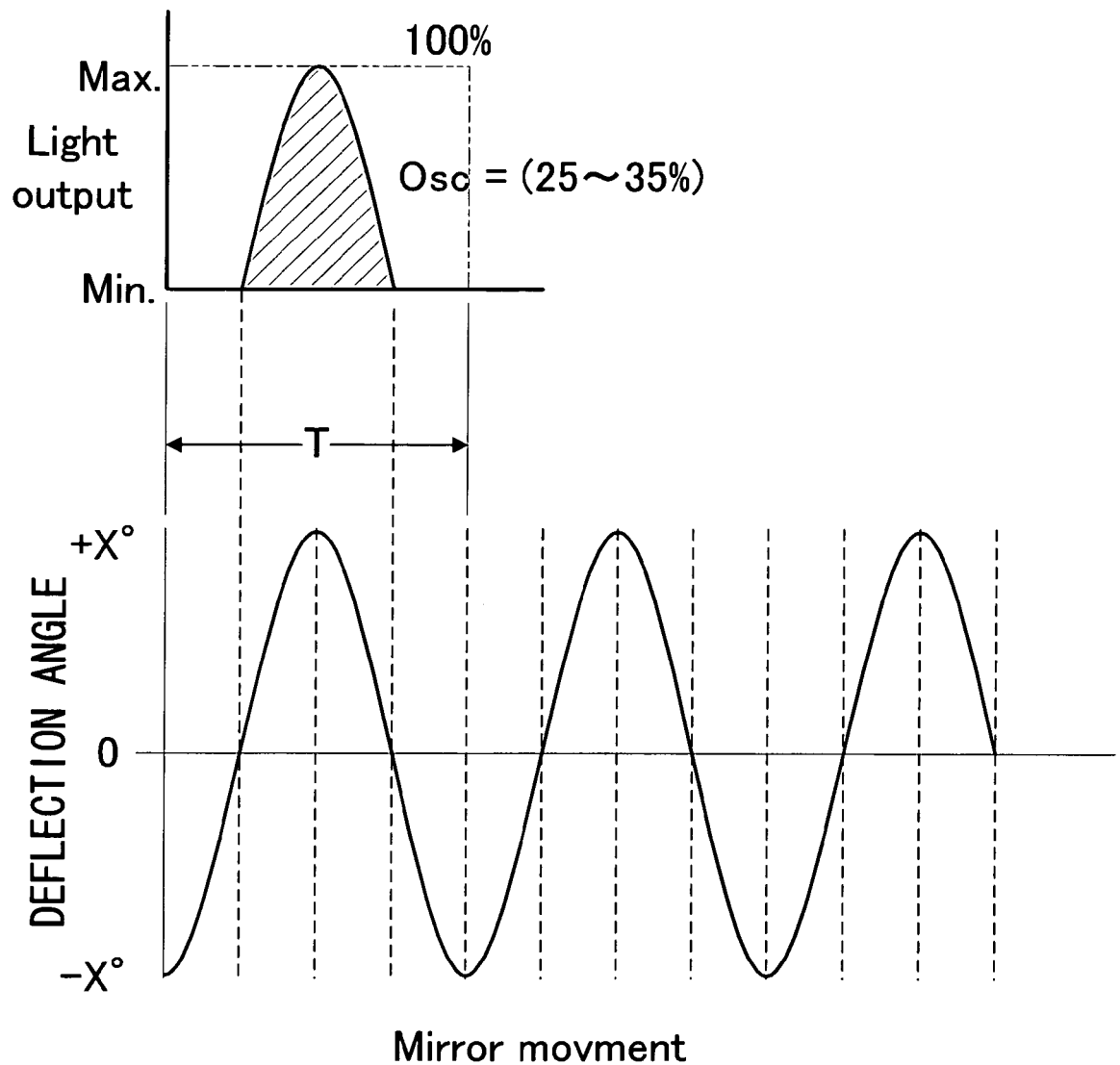
FIG. 14 is a diagram illustrating the relationship between the motions of the deflection mirror being controlled in the third deflection control state and the quantity of output light from the projection optical system.

FIG. 14 is a diagram illustrating the relationship between the motions of the deflection mirror being controlled to the third deflection control state and the quantity of output light from the projection optical system.

In this example, the deflection mirror being controlled to the third deflection control state oscillates within the range of the deflection angle (range of inclination angle), i.e., between $-X°$ and $+X°$.

In this example, $-X°$ is the deflection angle of the deflection mirror when it is controlled to the second deflection control state, and $+X°$ is the deflection angle of the deflection mirror when it is controlled to the first deflection control state. Also, in this example, the projection optical system is configured such that the light reflected from the deflection mirror at the time of the deflection angle being $0°$ is at outside the pupil (NA: Numerical Aperture) of the projection optical system shown as as (3) in FIG. 2.

In this example, in the time period of 1 oscillation cycle of the deflection mirror ("T" in FIG. 14), supposing that the quantity of output light obtained by controlling the deflection mirror to the first deflection control state is 100%, it is indicated that the ratio of the quantity of output light obtained by controlling the deflection mirror to the third deflection control state becomes between 25 to 35%.

Hereinafter, in the time period of 1 oscillation cycle of the deflection mirror, the ratio of the quantity of output light obtained by controlling the deflection mirror to the third deflection control state, supposing that the quantity of output light obtained by controlling the deflection mirror to the first deflection control state is 100%, is referred to as an "output light quantity ratio" or Osc (with the unit "%"), except cases otherwise indicated.

In the projection apparatus according to the present embodiment, the output light quantity ratio can be changed by the F-number of the projection optical system and the light intensity distribution in the pupil (Numerical Aperture) of the illumination optical system. That is, the output light quantity ratio is variable by changing the F-number and/or the light intensity distribution in the pupil (Numerical Aperture) of the illumination optical system.

Figure 15:
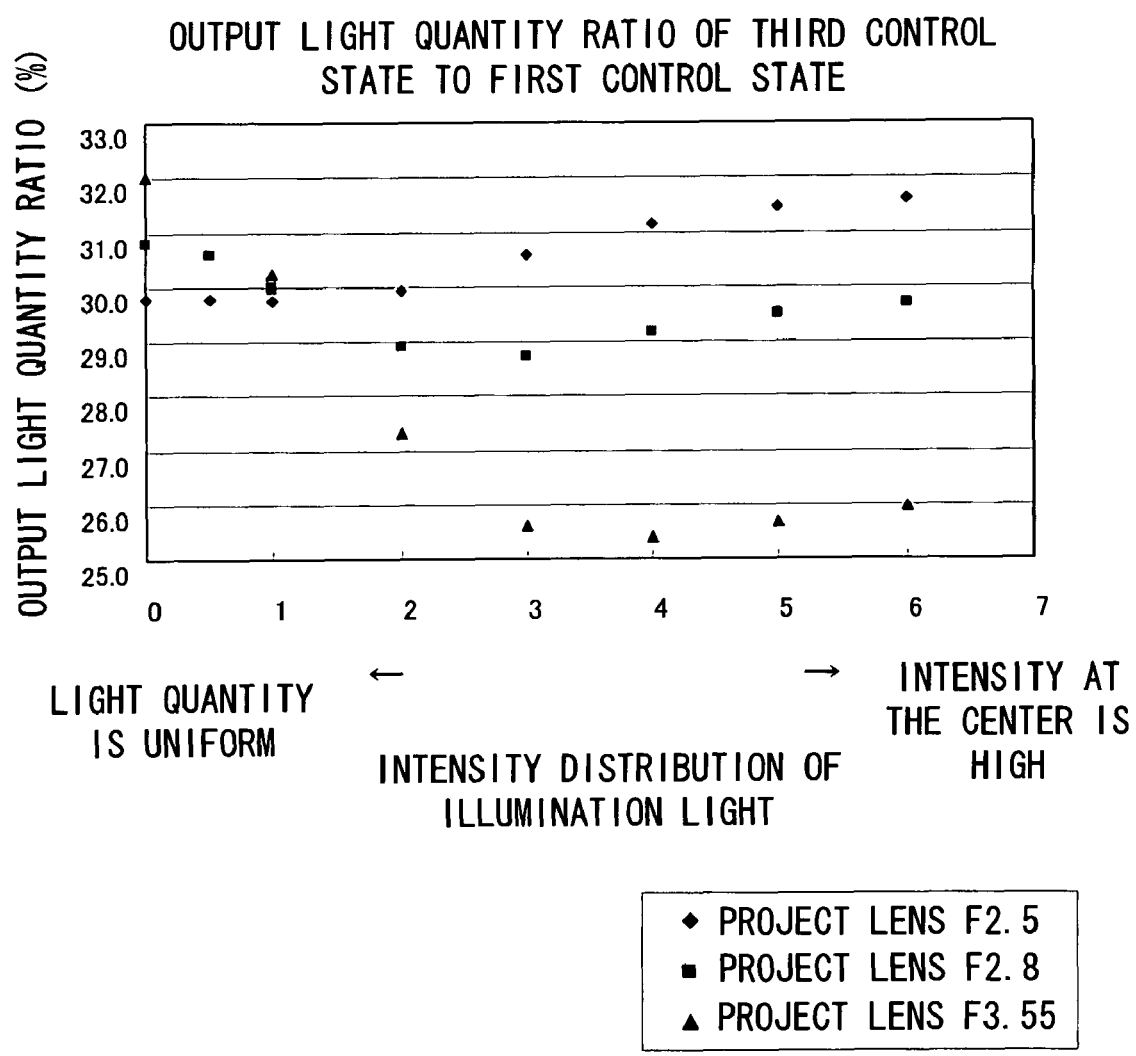
FIG. 15 is a diagram showing a graph where the horizontal axis represents the light intensity distribution in the pupil (numerical aperture) of the illumination optical system and the vertical axis represents the output light quantity ratio.

FIG. 15 is a diagram showing a graph where the horizontal axis represents "the light intensity distribution in the pupil (Numerical Aperture) of the illumination optical system" and the vertical axis represents "the output light quantity ratio". In this drawing, a "fixed mirror" is the deflection mirror that is controlled to the first deflection control state, and an "oscillating mirror" is the deflection mirror that is controlled to the third deflection control state.

As shown in FIG. 15, the relationship between the light intensity distribution in the pupil (Numerical Aperture) of the illumination optical system and the output light quantity ratio differs depending on the three-types of projection lenses (projection optical systems) with different F-numbers.

This graph shows that, when the light intensity distribution in the pupil (Numerical Aperture) of the illumination optical system is uniform at a value larger than a predetermined value, the larger the F-number of the projection lens, the larger the output light quantity ratio becomes. The graph also shows that, when the intensity at the center of the light intensity distribution is high in the pupil (Numerical Aperture) of the illumination optical system, conversely, the larger the F-number of the projection lens, the smaller the output light quantity ratio becomes. It can be seen from the above that, when there is no change in the light intensity distribution in the pupil (Numerical Aperture) of the illumination optical system, the quantity of output light from the projection lens, at which the deflection mirror is controlled to the third deflection control state, is variable by changing the F-number of the projection lens. In the projection apparatus according to the present embodiment, a display with higher gray scale modulations and gray scale correction, at which the deflection mirror is controlled to the third deflection control state, is enabled by using the characteristics described above.

Specifically, in the projection apparatus according to the present embodiment, an aperture is provided at the pupil of the projection optical system, and the F-number of the projection optical system is changed by changing/controlling the aperture diameter. Note that the control/change of the aperture diameter is performed, for example, by a control unit.

FIG. 16, FIG. 17, FIG. 18, and FIG. 19 are diagrams showing an example of the control of the deflection mirror and the aperture of the projection optical system in 1 time frame.

For simplicity's sake, in each of the drawings of FIGS. 16 through 19 show an example of the control of only one representative deflection mirror. In the drawings, a "Mirror State" of the deflection mirror, an "Aperture State" of the projection optical system, and "Output light intensity" from the projection optical system in 1 time frame are shown.

Figure 16:
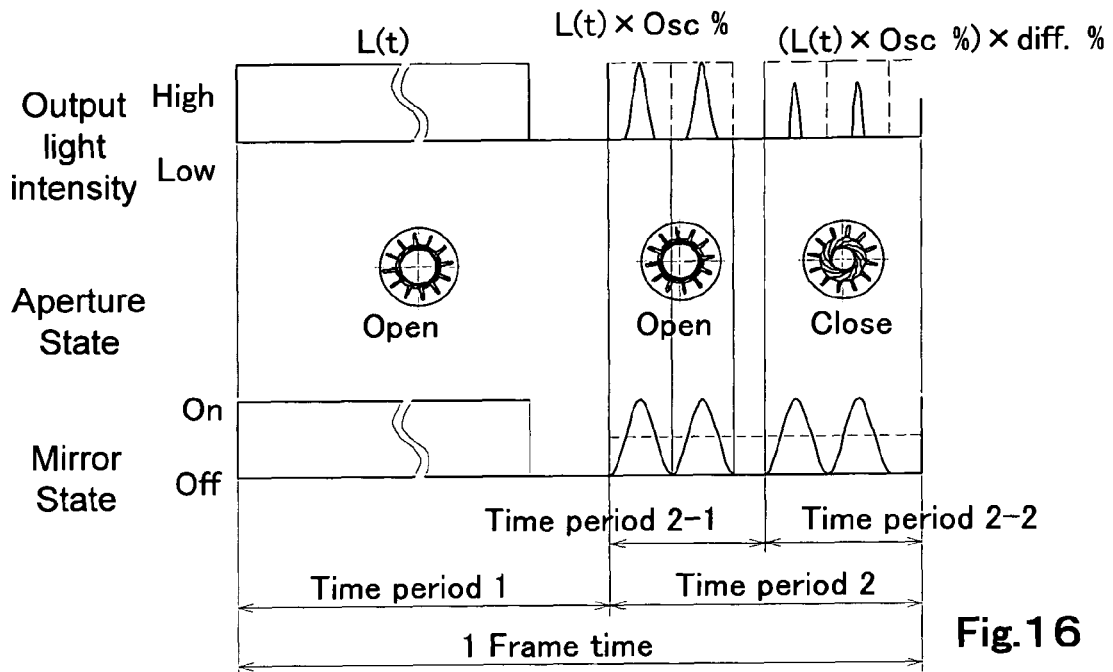
FIG. 16 is the first diagram showing an example of control of the deflection mirror and the aperture of the projection optical system in 1 timeframe.

In the example of the control shown in FIG. 16, 1 time frame is divided into time period 1 and time period 2. Furthermore, the time period 2 is divided into the two time periods 2-1 and 2-2. Time period 1 is the time period for controlling the deflection mirror to switch between the first deflection control state and the second deflection control state, and the aperture diameter is controlled to be fully open. Time period 2 is the time period for controlling the deflection mirror to switch between the third deflection control state and the second deflection control state; and time period 2-1 is the time period for controlling the aperture diameter to be fully open; and time period 2-2 is the time period for reducing the aperture diameter. More specifically, identical control process is applied to the deflection mirror in time periods 2-1 and 2-2.

As described above, the aperture of the projection optical system is fully open in time period 1 and time period 2-1, and it is controlled in time period 2-2 such that the aperture diameter of the projection optical system becomes small and the F-number becomes large. Consequently, the quantity of output light obtained in one oscillation cycle of the deflection mirror in time period 2-2 can be made smaller than the quantity of output light in time period 2-1.

Supposing that the time for one oscillation cycle of the deflection mirror is "t", and that the quantity of output light obtained by controlling the deflection mirror to the first deflection control state for duration of time "t" is "L(t)", the quantity of output light obtained by one oscillation cycle of the deflection mirror in the time period 2-1 is L(t)*Osc. In time period 2-2, in addition to the output light quantity ratio Osc' (%) newly determined by changing the F-number of the projection optical system, due to a decrease light quantity ratio "diff" (%), that is due to an increase in F-number, the quantity of output light ((L(t)*Osc')*diff) different from the quantity of output light (L(t)*Osc) in the time period 2-1 can be obtained as the quantity of output light obtained by one oscillation cycle of the deflection mirror.

In this example control, the minimum quantity of output light that constitutes the gray scale modulation is variable, and, thereby, reproducible gray scale modulations can be increased.

Figure 17:
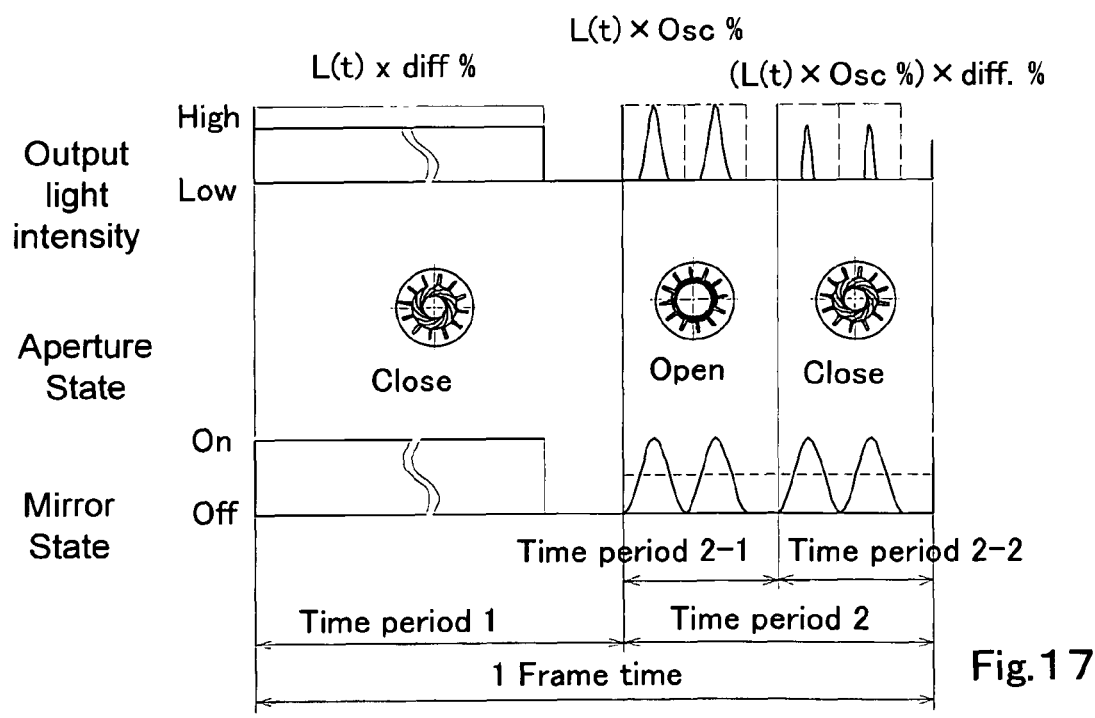
FIG. 17 is the second diagram showing an example of control of the deflection mirror and the aperture of the projection optical system in 1 timeframe.
Figure 18:
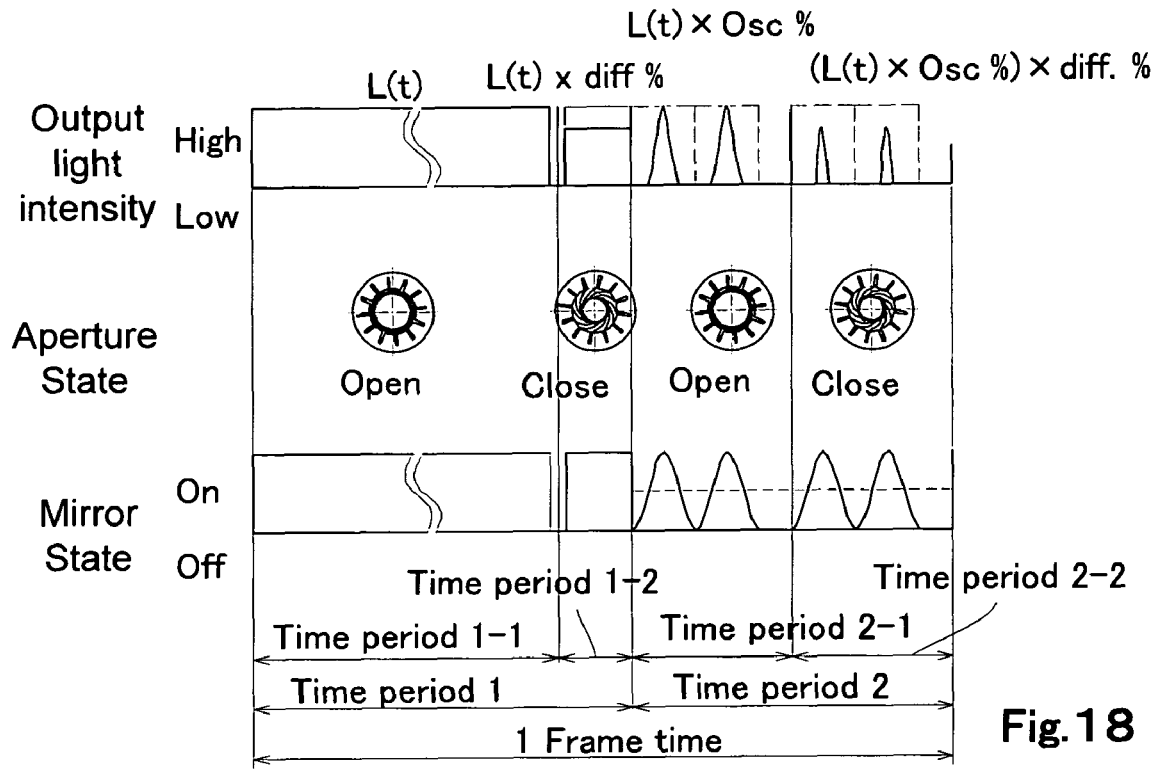
FIG. 18 is the third diagram showing an example of control of the deflection mirror and the aperture of the projection optical system in 1 timeframe.
Figure 19:
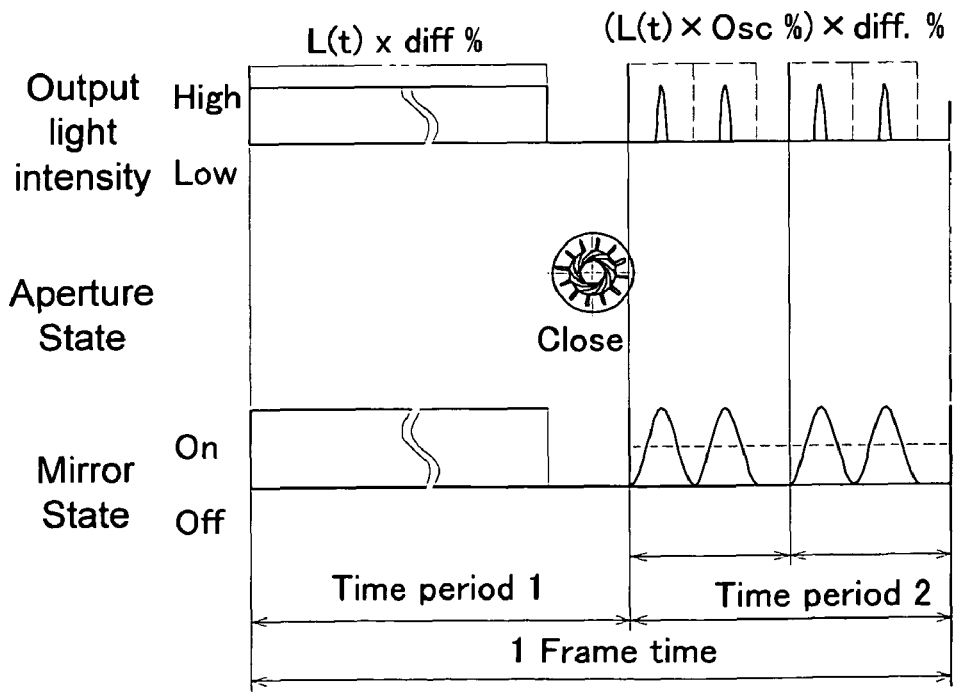
FIG. 19 is the fourth diagram showing an example of control of the deflection mirror and the aperture of the projection optical system in 1 timeframe.

The example controls shown in FIGS. 17 through 19 are the modifications of the example control shown in FIG. 16.

The example control shown in FIG. 17 is different from the control shown in FIG. 16, which was configured for the purpose of increasing the gray scale modulations by adjusting the F-number. In this example control, in time period 1 the aperture diameter of the projection optical system becomes small and the F-number becomes large, in the same way as in time period 2-2. In this example, the quantity of output light in time period 1 is "L(t)*diff" due to the decreased light quantity ratio "diff", due to an increase in F-number.

In the example control shown in FIG. 18, time period 1 is divided into two time periods 1-1 and 1-2. Also, in time period 1-2, the aperture diameter of the projection optical system becomes small and the F-number becomes large, in the same way as in time period 2-2. In this example, the quantity of output light in the time period 1-2 is "L(t)*diff" due to a decrease in the light quantity ratio "diff", is due to an increase in F-number.

In the controls shown in FIGS. 16 through 18, the amount of change in the aperture diameter of the projection optical system, i.e., the amount of change in the F-number of the projection optical system, is determined on the basis of, for example, uniformity, such as whether the light intensity distribution in the pupil (Numerical Aperture) of the illumination optical system is uniform or high at the center of the intensity.

In the control shown in FIG. 19, throughout the duration of 1 time frame the aperture diameter of the projection optical system becomes small and the F-number becomes large. In this example, the quantity of output light in time periods 1 and 2-1 is respectively "L(t)*diff" and "(L(t)*Osc')*diff", due to the decrease light quantity ratio "diff", due to an increase in F-number. Also, the amount of change in the aperture diameter, i.e., the amount of change in the F-number, is determined on the basis of the brightness information of the projection image in an input signal. According to this example control, when a dark scene is reproduced on the entire display, a black level can be lowered by decreasing the entire brightness.

Also, in this control, the difference between the output light quantity ratio (Osc), which is controlled such that the aperture of the projection optical system is open in the other frames (not shown), and the output light quantity ratio (Osc'), which is controlled such that the aperture of the projection optical system becomes small as shown in the time period 2 of FIG. 19, is corrected by changing the duration of time for controlling the deflection mirror to the third deflection control state by the control unit. According to this control, a displacement in the minimum quantity of output light reproduced by the deflection mirror, which is controlled to the third deflection control state, can be corrected when the output light quantity is increased/decreased by changing the F-number of the projection optical system all across 1 time frame. Therefore, an increase of the dynamic range can reproduce the image with an appropriate level of gray scales can be reproduced.

In the example controls shown in FIGS. 16 through 19, the output light quantity ratio is changed by adjusting the F-number of the projection optical system. However, it may be configured so that the output light quantity ratio is changed by adjusting both the F-number of the projection optical system and the light intensity distribution in the pupil (Numerical Aperture) of the illumination optical system.

In the projection apparatus according to the present embodiments, the quantity of output light in the LSB time periods of ordinary PWM control is to be obtained by controlling the deflection mirror to the third deflection control state, as shown in above-mentioned FIG. 1D; the natural frequency cycle (T) of the oscillation system, including a hinge as an elastic member, is defined as follows.

Natural Frequency Cycle $(T)=2\pi\sqrt{(I/K)}=LSB$ time/$Osc$

Where:
I: Rotation Moment of Oscillation System
K: Spring Constant of Hinge
LSB time: LSB Cycle at n-Bit Display
Osc: Output Light Quantity Ratio.

"I" is determined by the weight of the deflection mirror and the distance between the center of gravity and center of rotation.

"K" is determined by the thickness, width, length, material, and shape of the cross-section of the hinge.

"LSB time" is determined by 1 time frame, or by a time frame and the number of reproduction bits when the projection apparatus is a single-panel.

"Osc" is, as described previously, determined particularly by the F-number of the projection system and the light intensity distribution in the pupil (Numerical Aperture) of the illumination optical system.

For example, in a single-panel projection apparatus achieving a color display by the color sequential display method, when the output light quantity ratio (Osc) is 32% and the minimum quantity of output light of 10 bit gray scales is to be obtained by the deflection mirror deflected to the third deflection control state, "I" and "K" are designed such that the natural frequency cycle "T=1/((60*3*2^10)*0.32)≅17.0 [usec]" is achieved.

Figure 1A:
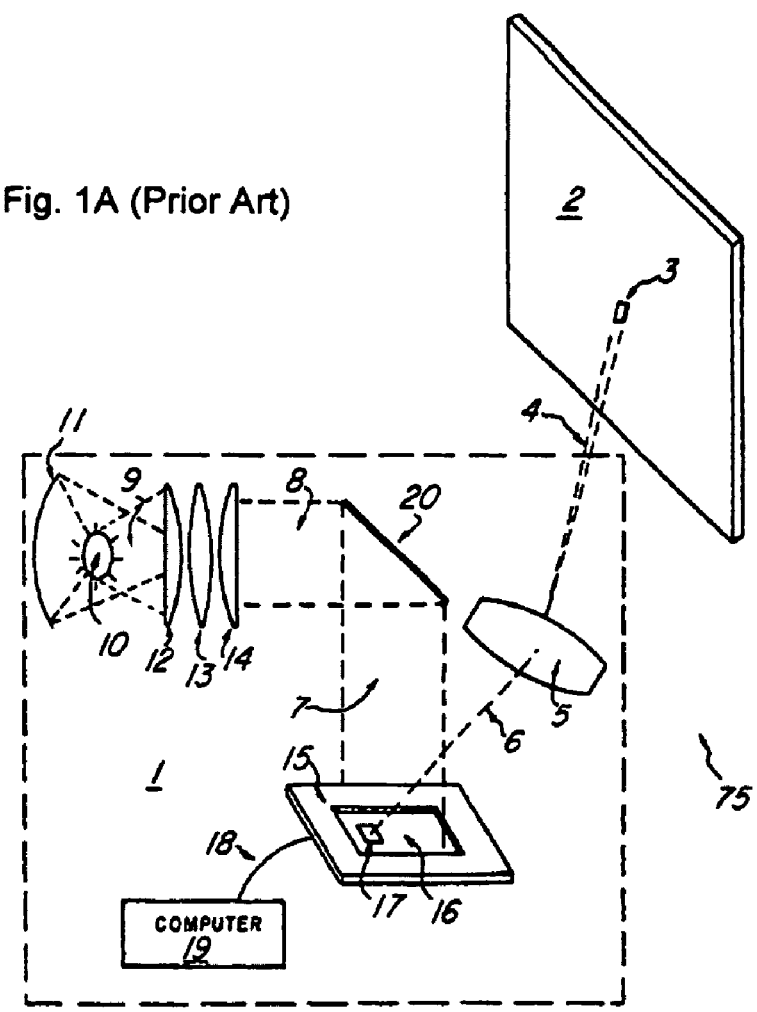
FIGS. 1A and 1B are functional block diagrams to present a top view of a portion of a micromirror array implemented as a spatial light modulator for a digital video display system of a conventional display system disclosed in a prior art patent.
Figure 1B:
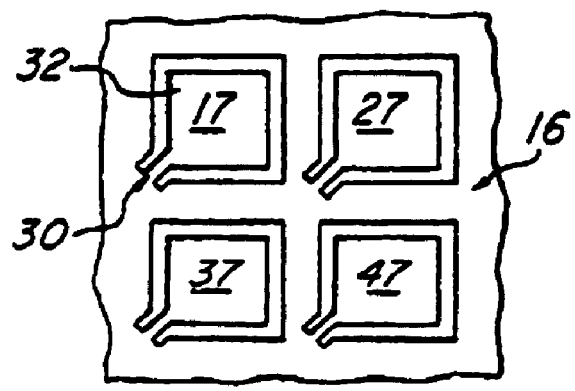
Figure 1C:
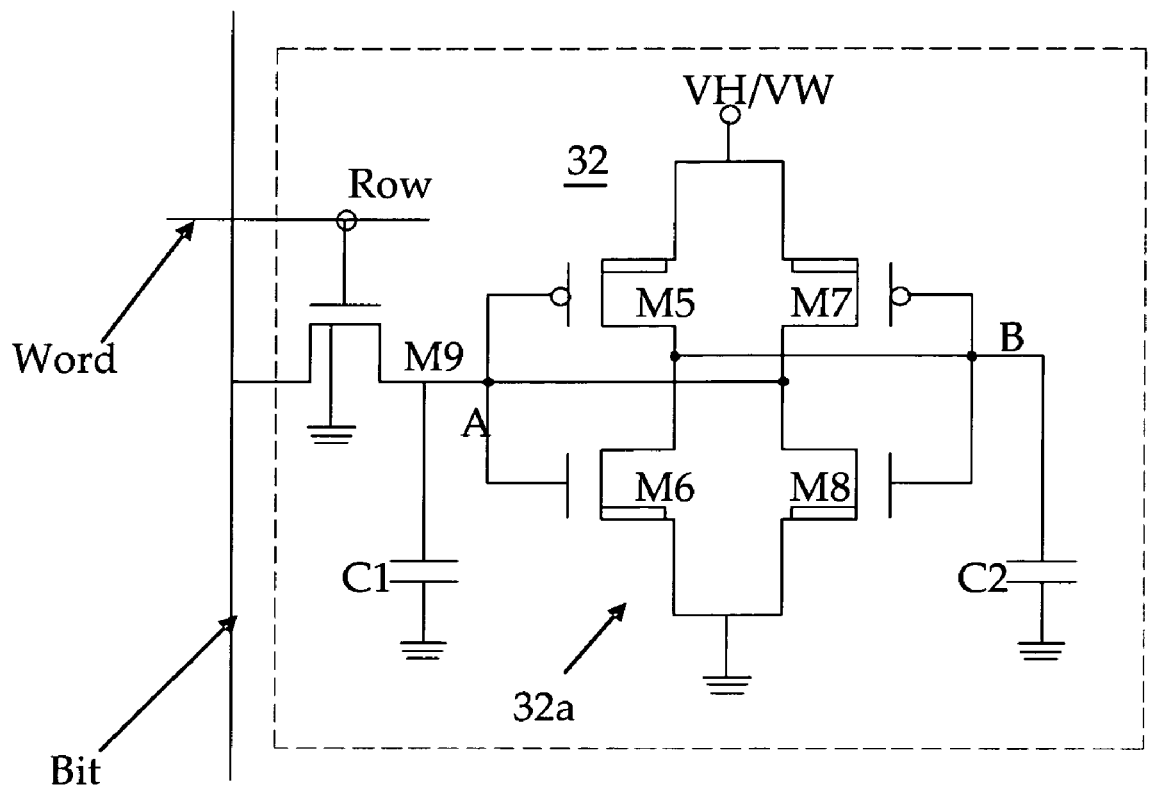
FIG. 1C is a circuit diagram showing a prior art circuit for positioning a micromirror at the ON and OFF states of a spatial light modulator.
Figure 1D:
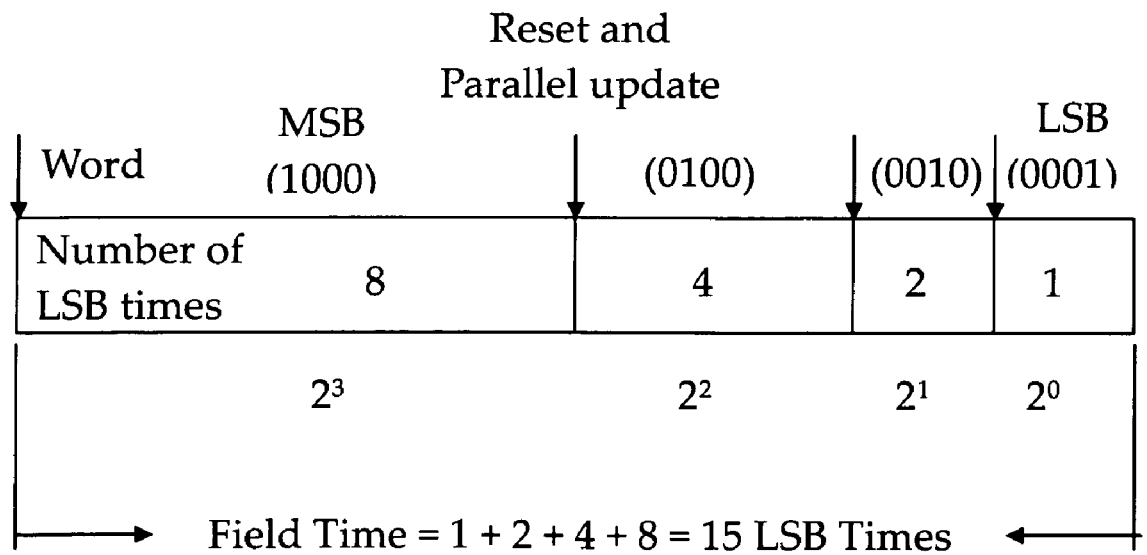
FIG. 1D is a diagram showing the binary time intervals for a four bit gray scale.

In contrast, when the time for the switching transition, "tM", for the deflection mirror using conventional PWM control, as shown in FIG. 1D, is made almost equal to the number of natural frequency of the oscillation system of the deflection mirror, and the LSB time period is defined such that light deficiency in the time "tM" can sufficiently be ignored, even if the LSB time period is five times the time for the switching transition "tM", the gray scales that can be reproduced in the above-mentioned hinge is approximately 8 bit. That is, by using a hinge capable of expressing only 8 bit or so in the conventional control, 10 bit gray scales can be expressed in the present embodiment. Thus, it can be seen that, if the output light quantity ratio (Osc) is 25%, the natural frequency cycle "T" should be designed to be approximately 22[usec], using the same calculation above. If 12 bit gray scales are to be obtained in the PWM-only control, using a hinge capable of expressing approximately 10 bit gray scales by applying the control according to the present invention, the natural frequency cycle "T" is designed to be approximately 4-6[usec]. Note that it is assumed that, for the above number of natural frequency, the output light quantity ratio is 25%. If this ratio is changed due to the configuration of the system, the number of natural frequency will be individually determined on the basis of the value of the changed ratio. Preferably, the natural frequency cycle "T" is 4-30[usec]. As described above, the present invention does not require a strong hinge in order to obtain an image with high gray scale modulations, and this provides advantages such as a lowered voltage in driving voltage or improved durability of the hinge. Furthermore, due the lowered driving voltage and the alleviation of stress to the hinge, the mirror deflection angle can be increased, the direction of the reflected light flux in the OFF state of the deflection mirror can be distanced from the pupil position of the projection lens, and, thus, high contrast can be achieved. Preferably, the first and second deflection direction is deflected by more than 12 degrees against the non-deflection state.

Specifically, according to above descriptions of FIG. 15, the output light quantity ratio is approximately the same as the light intensity distribution in the pupil (Numerical Aperture) of the illumination optical system. This is also a state when the output light quantity ratio caused by the variation of the aperture ratio in the projection optical system becomes minimized. This state is preferable since it provides easier control in the reproduction of gray scale modulations, in which the deflection mirror is controlled to the third deflection control state. That is, in the projection apparatus according to the present embodiment, by setting the light intensity distribution in the pupil (Numerical Aperture) of the illumination optical system to a light intensity distribution in which the output light quantity ratio is almost the same regardless of the F-number of the projection lens, the accuracy of the reproduction of gray scale cannot be improved with the F-number of the projection lens being variable, but the reproduction of gray scale by controlling the deflection mirror to the third deflection control state can be maintained at a constant level regardless of the setting condition of the projection lens. Therefore, a more convenient control process can be implemented.

According to the third embodiment as described above, the amount of output light ratio is adjustable by changing the F-number of the projection optical system and/or the light intensity distribution in the pupil (Numerical Aperture) of the illumination optical system. Therefore, the deflection mirrors can be controlled in an image projection apparatus to project an image with higher gray scales without increasing the natural frequency of the oscillation system.

The above descriptions have disclosed the first, the second, and the third embodiments. In different embodiments, a light source may be implemented to emit incoherent light, such as a high-pressure mercury lamp, a halogen lamp, a xenon lamp, an LED, etc. Alternately a laser light source may be implemented to emit coherent light.

Also, the inventive features and configurations of two or more of the first, second, and third embodiments can be combined.

According to the present invention described above, a control process by controlling the deflection of a number of deflection mirrors of a micromirror device combining with adjustment of the aperture ratio of a projection optical system, an image projection apparatus can project an image with higher levels of gray scale.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What is claimed is:

1. A projection apparatus comprising a micromirror device for reflecting and modulating a light emitted from a light source to project an image on a display screen, the projection apparatus further comprising:
    a projection optical system comprising an adjustable aperture for adjusting an aperture ratio to control an amount of output light reflected from said micromirror device to said image display screen;
    a controller to control the micromirror device including a plurality of micromirrors to operate in a first state, a second state and a third state as an intermediate state oscillating between the first state and the second state;
    said controller further controls and changes the aperture ratio of the projection optical system in a first control time period when at least one of the micromirrors is controlled to operate in the first state and/or a second control time period when at least one of the micromirrors is controlled to operate in the third state; and
    the controller further controls and changes the aperture ratio of the projection optical system in one or more of a plurality of divisional control time periods by further dividing the first control time period and/or the second control time period.

2. The projection apparatus according to claim 1, further comprising:
    said controller further controls the light source to project the illumination light with an unsymmetrical distribution for reflecting the incident light from the micromirrors with variations of cross sectional shapes for projecting an image light through said adjustable aperture with controllable light intensity.

3. The projection apparatus according to claim 2, further comprising:
    said controller further controls the light source to project the illumination light with the unsymmetrical distribution for reflecting the incident light from the micromirrors with an elliptic cross sectional shapes.

4. The projection apparatus according to claim 1, further comprising:
    said controller further controls the light source to project the illumination light with the unsymmetrical distribution for reflecting the incident light from the micromirrors with two partially overlapping elliptic cross sectional shapes.

5. The projection apparatus according to claim 1, wherein:
    the controller further controls the adjustable aperture ratio of the projection optical system to correspond with a light intensity distribution uniformity in a numeral aperture (NA) of an illumination optical system condensing and orienting the illumination light emitted from the light source.

6. The projection apparatus according to claim 1, wherein:
    the controller further controls the adjustable aperture ratio of the projection optical system is adjusted to correspond with a brightness data of a projected image embedded in an input signal.

7. The projection apparatus according to claim 1, further comprising:
    the controller further controls the adjustable aperture ratio of the projection optical system to correspond with a brightness data of a project image embedded in an input signal for controlling an amount of light reflected from the micromirrors operating in the third state.

8. The projection apparatus according to claim 1, further comprising:
    the controller further controls the adjustable aperture ratio of the projection optical system to correspond with a brightness data of a project image embedded in an input signal and adjusts a light intensity distribution in a numeral aperture (NA) of an illumination optical system condensing and orienting the illumination light emitted from the light source for controlling an amount of light reflected from the micromirrors operating in the third state.

9. The projection apparatus according to claim 1, further comprising:
    the micromirrors having a natural oscillation cycle time represented by T where T is substantially in a range between 4 to 30 microseconds.

10. The projection apparatus according to claim 1, further comprising:
    the micromirrors are controllable to deflect to a deflection angle approximately equal to or greater than 12 degrees relative to a non-deflectable state.

11. The projection apparatus according to claim 1, wherein:
    the light source is an adjustable light source controllable to emit the illumination light with an adjustable light intensity.

* * * * *